US007868060B2

(12) United States Patent
Sakai et al.

(10) Patent No.: US 7,868,060 B2
(45) Date of Patent: Jan. 11, 2011

(54) AQUEOUS INK, INK JET RECORDING METHOD, INK CARTRIDGE, RECORDING UNIT, INK JET RECORDING APPARATUS, AND IMAGE

(75) Inventors: Junichi Sakai, Machida (JP); Kousuke Yamasaki, Kawasaki (JP); Katsuhiko Suzuki, Tokyo (JP); Itaru Tsuji, Kawasaki (JP); Aki Takano, Kawasaki (JP); Hideki Takayama, Fujisawa (JP); Shin-ichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 12/024,222

(22) Filed: Feb. 1, 2008

(65) Prior Publication Data
US 2008/0187726 A1 Aug. 7, 2008

(30) Foreign Application Priority Data
Feb. 5, 2007 (JP) ............................. 2007-025141
Jan. 21, 2008 (JP) ............................. 2008-010045

(51) Int. Cl.
*B05D 1/36* (2006.01)
*B05D 5/00* (2006.01)
*B05D 7/00* (2006.01)
*B32B 9/04* (2006.01)
*B32B 27/00* (2006.01)
*B41J 2/01* (2006.01)
*B41J 2/17* (2006.01)
*B41J 2/175* (2006.01)
*B60C 7/00* (2006.01)
*C08J 3/00* (2006.01)
*C08K 3/00* (2006.01)
*C08K 3/04* (2006.01)
*C08L 31/00* (2006.01)
*C08L 33/00* (2006.01)
*C09D 5/02* (2006.01)
*C09D 11/00* (2006.01)
*G01D 11/00* (2006.01)
*H01B 1/12* (2006.01)

(52) U.S. Cl. ............................. 523/160; 347/1; 347/84; 347/85; 347/86; 347/95; 347/100; 427/256; 427/258; 427/288; 427/402; 427/407.1; 427/411; 428/411.1; 428/500; 523/161; 524/401; 524/495; 524/496; 524/500; 524/556; 524/558

(58) Field of Classification Search ................. 523/160, 523/161; 524/401, 495, 496, 500, 556, 558; 347/1, 84, 85, 86, 95, 100; 427/256, 258, 427/288, 402, 407.1, 411; 428/411.1, 500
See application file for complete search history.

(56) References Cited
U.S. PATENT DOCUMENTS 5,395,434 A    3/1995  Tochihara et al. ......... 106/22 R
5,415,686 A    5/1995  Kurabayashi et al. ..... 106/26 R
5,451,251 A    9/1995  Mafune et al. ............ 106/22 H
5,482,545 A    1/1996  Aoki et al. ................ 106/22 K
5,485,188 A    1/1996  Tochihara et al. ........... 347/100
5,835,116 A   11/1998  Sato et al. ..................... 347/98
5,933,164 A    8/1999  Sato et al. ..................... 347/43
6,003,987 A   12/1999  Yamamoto et al. .......... 347/100
6,027,210 A    2/2000  Kurabayashi et al. ....... 347/100
6,186,615 B1   2/2001  Sato et al. ..................... 347/43
6,238,045 B1   5/2001  Ono et al. ..................... 347/96
6,322,209 B1  11/2001  Sato et al. .................... 347/105
6,511,534 B1   1/2003  Mishina et al. ............ 106/31.33
6,528,146 B2   3/2003  Okuda et al. ................ 428/195
6,585,366 B2   7/2003  Nagata et al. ............... 347/101
6,698,876 B2   3/2004  Sato et al. ................... 347/100
6,802,925 B2  10/2004  Kobayashi et al. .......... 156/234
6,848,781 B2   2/2005  Ogino et al. ................. 347/105

(Continued)

FOREIGN PATENT DOCUMENTS

EP      556649      *  8/1993
EP    1 295 916 A1    3/2003
EP    1 394 207 A1    3/2004
JP     8-269374       10/1996

OTHER PUBLICATIONS

D.W. Van Krevelen, *Properties of Polymers*, 2nd Edition (1976), pp. 129-159 (p. 154).
Oct. 23, 2009 European Search Report in European Patent Application No. 08151015.8.

*Primary Examiner*—Patrick D Niland
(74) *Attorney, Agent, or Firm*—Fitzpatrick, Cella, Harper & Scinto

(57) ABSTRACT

Provided is an aqueous ink with high storage stability and scratch resistance at such a high level that the coloring material of an image is not scraped off even when lightly touched with a sharp product. The aqueous ink includes a water-insoluble coloring material and plural polymers. The plural polymers include a polymer A which relatively contributes to dispersion of the water-insoluble coloring material and a polymer B which does not relatively contribute to the dispersion of the water-insoluble coloring material compared to the polymer A. The polymer A includes a block copolymer having an acid value of 120 mgKOH/g to 180 mgKOH/g and having an ethylene oxide group as a nonionic group. The polymer B has an acid value of 150 mgKOH/g or less and a hydrogen bond parameter ($\delta h$) of the polymer obtained by solubility parameters of monomers constituting the polymer of 1.0 $cal^{0.5}/cm^{1.5}$ or more and 3.2 $cal^{0.5}/cm^{1.5}$ or less.

14 Claims, 7 Drawing Sheets

U.S. PATENT DOCUMENTS

| | | | |
|---|---|---|---|
| 6,874,881 B2 | 4/2005 | Shirota et al. | 347/100 |
| 6,976,755 B2 | 12/2005 | Sato et al. | 347/100 |
| 7,008,977 B2 | 3/2006 | Sakai et al. | 523/200 |
| 7,029,109 B2 | 4/2006 | Shirota et al. | 347/100 |
| 7,055,943 B2 | 6/2006 | Suzuki et al. | 347/100 |
| 7,144,452 B2 | 12/2006 | Takayama et al. | 106/31.52 |
| 7,160,372 B2 | 1/2007 | Yoshizawa et al. | 106/31.47 |
| 7,198,664 B2 | 4/2007 | Mafune et al. | 106/31.28 |
| 7,198,665 B2 | 4/2007 | Nakamura et al. | 106/31.52 |
| 7,208,033 B2 | 4/2007 | Kawabe et al. | 106/31.48 |
| 7,226,498 B2 | 6/2007 | Yamashita et al. | 106/31.5 |
| 7,241,332 B2 | 7/2007 | Yoshizawa et al. | 106/31.47 |
| 7,244,299 B2 | 7/2007 | Tsuji et al. | 106/31.48 |
| 7,247,193 B2 | 7/2007 | Sato | 106/31.27 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,285,159 B2 | 10/2007 | Aikawa et al. | 106/31.47 |
| 7,288,143 B2 | 10/2007 | Aikawa et al. | 106/31.58 |
| 7,291,211 B2 | 11/2007 | Kaneko et al. | 106/31.27 |
| 7,291,214 B2 | 11/2007 | Tsuji et al. | 106/31.8 |
| 7,291,361 B2 | 11/2007 | Ogino et al. | 427/258 |
| 7,294,184 B2 | 11/2007 | Fujimoto et al. | 106/31.47 |
| 7,297,197 B2 | 11/2007 | Jinnou et al. | 106/31.47 |
| 7,297,202 B2 | 11/2007 | Ichinose et al. | 106/31.6 |
| 7,297,203 B2 | 11/2007 | Takada et al. | 106/31.8 |
| 2004/0244622 A1 | 12/2004 | Ichinose et al. | 101/491 |
| 2005/0005818 A1 | 1/2005 | Sato et al. | 106/31.27 |
| 2006/0007288 A1 | 1/2006 | Takada et al. | 347/100 |
| 2006/0009544 A1 | 1/2006 | Miyagawa et al. | 523/160 |
| 2006/0098067 A1 | 5/2006 | Imai et al. | 347/100 |
| 2006/0103705 A1 | 5/2006 | Yoshizawa et al. | 347/100 |
| 2006/0130706 A1 | 6/2006 | Nakajima et al. | 106/499 |
| 2006/0135647 A1 | 6/2006 | Ichinose et al. | 523/160 |
| 2006/0142416 A1 | 6/2006 | Sakai et al. | 523/160 |
| 2006/0167136 A1 | 7/2006 | Kaneko et al. | 523/160 |
| 2006/0192827 A1 | 8/2006 | Takada et al. | 347/100 |
| 2007/0188572 A1 | 8/2007 | Takayama et al. | 347/100 |

* cited by examiner

AQUEOUS INK, INK JET RECORDING METHOD, INK CARTRIDGE, RECORDING UNIT, INK JET RECORDING APPARATUS, AND IMAGE

BACKGROUND OF THE INVENTION

1. Field of the Invention

The present invention relates to an aqueous ink using a water-insoluble coloring material as a coloring material, and an ink jet recording method, an ink cartridge, a recording unit, an ink jet recording apparatus, and an image each using the aqueous ink.

2. Description of the Related Art

Coloring materials of inks for use in ink jet recording are mainly classified into dyes and pigments; the use of a dye as a coloring material has been conventionally a mainstream in order to obtain ease as an aqueous ink and high color developability of a formed image. In recent years, however, the development of an aqueous pigment ink using a pigment as a coloring material has been advanced for the purpose of, for example, additionally improving the weatherability of an image. The following procedure has been widely performed: a polymer dispersant (hereinafter referred to as "dispersant") or the like is used in the pigment ink as a dispersant for the pigment which is insoluble to water.

An image formed of a pigment ink is excellent in weatherability as compared to an image formed of a dye ink, but the former image involves a problem in that the scratch resistance of the former image is lower than that of the latter image. A proposal concerning a contrivance on a water-soluble polymer to be incorporated into ink has been made to solve the problem (see Japanese Patent Application Laid-Open No. H08-269374).

However, scratch resistance requested of a conventional recorded article, the scratch resistance being at such a level that a coloring material is not scraped off when an image is scratched with a finger or the like, does not suffice for an image to be displayed outdoors such as a poster, a panel, a sign, or a point-of-purchase advertisement, so a high degree of scratch resistance is requested of such image. For example, a considerably large recording medium such as an A0-size medium or an A1-size medium is often used in applications where a poster or an advertisement is printed, so the recording medium on which an image has been formed is generally rolled into a cylindrical shape upon carrying of the medium. In addition, upon rolling of the recording medium, the image is scratched with a sharp portion such as a corner of the recording medium in some cases. In such cases, even when a conventional pigment ink credited with satisfying the scratch resistance of the image at a high level is used, a flaw is formed on the formed image, and a coloring material is scraped off. In the case of the conventional pigment ink, the problem occurs at a considerable frequency.

In addition, a problem similar to that described above occurs in other situations such as a situation in which an image formed of a pigment ink is lightly touched with a sharp product such as a nail upon sticking of the image as a poster outdoors. In this situation, as in the case of the foregoing, the following problem occurs at a considerable frequency: the coloring material of the image formed of the pigment ink is scraped off. As described above, particularly when a pigment ink is selected as an ink for use in a large ink jet recording apparatus, a scratch resistance higher than a conventional one is requested, the scratch resistance being at such a level that the coloring material of an image is not scraped off even when the image is touched with a sharp product such as a corner of a recording medium or a nail. The above-mentioned problem has been serious in a pigment ink in association with the expansion of the applications of an ink jet recorded image.

The scratch resistance of an image formed of a pigment ink has been heretofore of concern, so various methods have been proposed to achieve high scratch resistance. However, in most of the methods, investigation has been conducted on a small ink jet recording apparatus for use in offices and home applications, so the mere use of a conventional technique results in at most an image having such scratch resistance that no flaw is formed when a recording medium is touched with a finger. In other words, it has been still unable to solve a problem concerning the scratch resistance of an image formed of a pigment ink in such case as the image is touched with a sharp product such as a corner of a recording medium or a nail.

To solve such problem, in order that the scratch resistance of an image formed of a pigment ink may be improved, the following idea has been made: a large amount of a polymer such as a dispersant is incorporated into the ink in order that a pigment constituting the image may be additionally strongly fixed to a recording medium. However, the addition of an excessive amount of a polymer or the like to the ink may involve the emergence of other problems such as a reduction in dispersion stability of the pigment or the like in the ink; a reduction in storage stability of the ink; and a reduction in ejection stability of the ink.

SUMMARY OF THE INVENTION

Therefore, an object of the present invention is to solve a problem concerning the aqueous ink containing a water-insoluble coloring material such as a pigment as described above. Specifically, the object of the present invention is to provide an aqueous ink satisfying high storage stability, and, furthermore, capable of forming an image having scratch resistance at such a high level that the coloring material of the image is not scraped off even when the image is lightly touched with a sharp product such as a nail. Another object of the present invention is to provide an ink jet recording method, an ink cartridge, a recording unit, and an ink jet recording apparatus with each of which an excellent image having the above high scratch resistance is stably obtained, and an image formed by using the aqueous ink.

Investigation conducted by the inventors of the present invention has shown that an ink containing one kind of a dispersant cannot achieve the above-mentioned objects of the present invention. In view of the foregoing, the inventors of the present invention have conducted investigation on the basis of the following new idea referred to as "separated function": multiple polymers having different properties in an ink containing the multiple polymers have different functions on a coloring material in the ink. As a result, the inventors have found that both high scratch resistance and storage stability can be achieved by the combined use of a polymer A which contributes to the dispersion of a water-insoluble coloring material to a relatively large extent and a polymer B which contributes to the dispersion of the water-insoluble coloring material to a relatively small extent as compared to the polymer A but which can contribute to the scratch resistance of an image.

That is, the present invention provides an ink jet aqueous ink including at least a water-insoluble coloring material and a plurality of polymers, in which the plurality of polymers include a polymer A which relatively contributes to dispersion of the water-insoluble coloring material and a polymer B which does not relatively contribute to the dispersion of the water-insoluble coloring material as compared to the polymer A, the polymer A is a block copolymer having an acid value of 120 mgKOH/g or more to 180 mgKOH/g or less and having an ethylene oxide group as a nonionic group, and the polymer B has an acid value of 150 mgKOH/g or less and a hydrogen bond parameter ($\delta h$) of the polymer obtained by solubility parameters of monomers constituting the polymers of 1.0 $cal^{0.5}/cm^{1.5}$ or more to 3.2 $cal^{0.5}/cm^{1.5}$ or less.

Another embodiment of the present invention provides an ink jet recording method including ejecting ink by an ink jet method and performing recording on a recording medium, in which the ink is the above aqueous ink.

Still another embodiment of the present invention provides an ink cartridge including an ink storage portion for storing ink, in which the ink stored in the ink storage portion includes the above aqueous ink.

Still further another embodiment of the present invention provides a recording unit including an ink storage portion for storing ink and a recording head for ejecting the ink, in which the ink stored in the ink storage portion is the above aqueous ink.

Still further another embodiment of the present invention provides an ink jet recording apparatus including an ink storage portion for storing ink and a recording head for ejecting the ink, in which the ink stored in the ink storage portion is the above aqueous ink.

Still further another embodiment of the present invention provides an image formed on a recording medium by ejecting ink according to an ink jet method, in which the ink is the above aqueous ink.

According to one aspect of the present invention, there can be provided an aqueous ink containing a water-insoluble coloring material satisfying high storage stability, and, furthermore, capable of providing scratch resistance at such a high level that the coloring material of an image is not scraped off even when the image is lightly touched with a sharp product such as a nail as well as, of course, when the image is scratched with a finger. In addition, according to another aspect of the present invention, there can be provided an ink jet recording method, an ink cartridge, a recording unit, and an ink jet recording apparatus with each of which the above excellent image can be stably obtained, and an image formed by using the aqueous ink.

Further features of the present invention will become apparent from the following description of exemplary embodiments with reference to the attached drawings.

DESCRIPTION OF THE EMBODIMENTS

Figure 1:
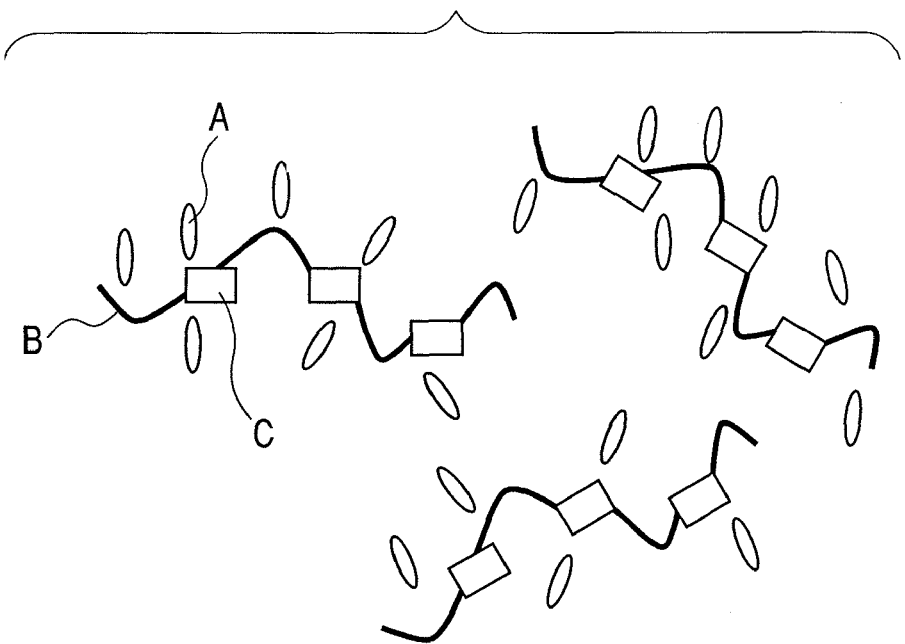
FIG. 1 is a schematic view showing the manner in which a polymer having a hydrogen bond parameter of the polymer obtained by the solubility parameter of a monomer constituting the polymer in excess of 3.2 $cal^{0.5}/cm^{1.5}$ is dissolved in an aqueous medium.

Hereinafter, the present invention will be described in detail with reference to a preferred embodiment. It should be noted that description will be given by taking a pigment as a representative example of a water-insoluble coloring material, but the present invention is not limited to the pigment. In addition, in the following description, an aqueous ink or a pigment ink may be simply referred to as "ink".

First, the inventors of the present invention have set the following criterion as a level of the scratch resistance of an image formed of a pigment ink targeted by the present invention: the coloring material of the image is not scraped off when the image is lightly touched with a sharp product such as a nail as well as, of course, when the image is scratched with a finger. An image capable of satisfying the criterion can realize sufficient scratch resistance even in the applications such as a poster or a point-of-purchase advertisement displayed outdoors. In view of the foregoing, the inventors of the present invention have conducted investigation on a polymer to be incorporated into ink in combination with a polymer dispersant in order that an image formed of the ink may satisfy such high scratch resistance as described above. As a result, the inventors have found that a polymer having such function needs to be a polymer which does not permeate into a recording medium together with an aqueous medium in the ink, but which remains on the recording medium to form a film. Further, the inventors have found that the polymer needs to satisfy the following two conditions for causing such phenomenon as described above when recording is performed by applying the pigment ink to an ink jet system. That is, the inventors have reached the conclusion that, in selecting a polymer which is incorporated into ink and which can contribute to the scratch resistance of an image, it is important to take two conditions, that is, the acid value of a polymer and the hydrogen bond parameter ($\delta h$) of the polymer obtained by the solubility parameter of a monomer constituting the polymer into consideration.

First, a relationship between the scratch resistance of the image and the hydrogen bond parameter ($\delta h$) of a polymer obtained by the solubility parameter of a monomer constituting the polymer, which is a condition in selecting a polymer to be incorporated into ink which can contribute to the scratch resistance of an image, will be described. The hydrogen bond parameter used in the present invention originates from a hydrogen bond, and an affinity between the polymer and water tends to increase as a value of the hydrogen bond parameter of the polymer increases. In the case of an ink containing mainly an aqueous medium like an ink jet aqueous ink, the property of causing mutual aggregation of a polymer tends to reduce as the hydrogen bond parameter of the polymer increases. In association with the tendency, the polymer is apt to permeate into a recording medium without aggregation on the recording medium, so the ratio of the polymer remaining on the recording medium tends to reduce. Accordingly, an improving effect on the scratch resistance of the image may not be exerted when the hydrogen bond parameter of a polymer contained in the aqueous ink increases.

Figure 2:
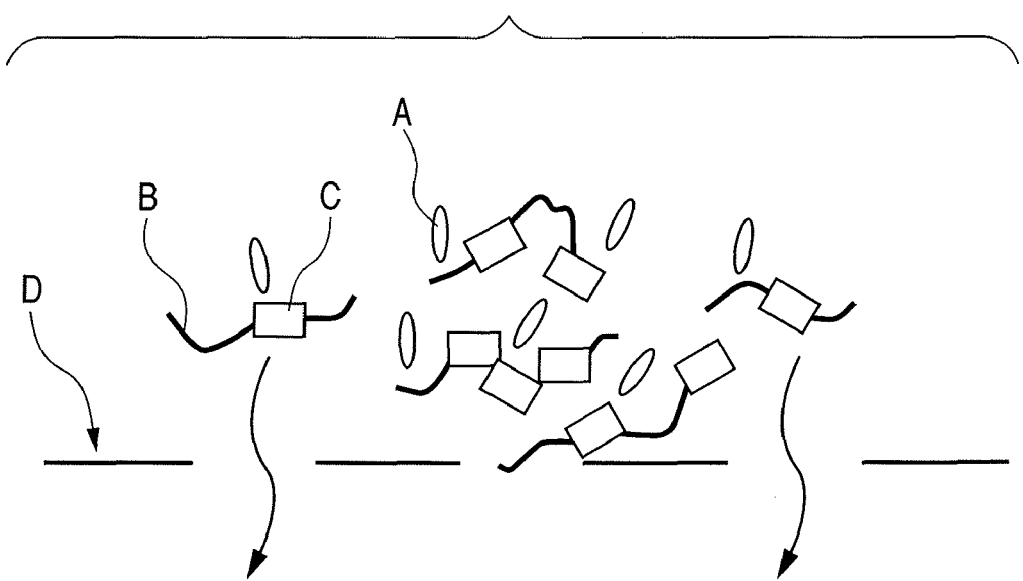
FIG. 2 is a schematic view showing the manner in which the polymer having a hydrogen bond parameter of the polymer obtained by the solubility parameter of a monomer constituting the polymer in excess of 3.2 $cal^{0.5}/cm^{1.5}$ permeates into a recording medium D.
Figure 3:
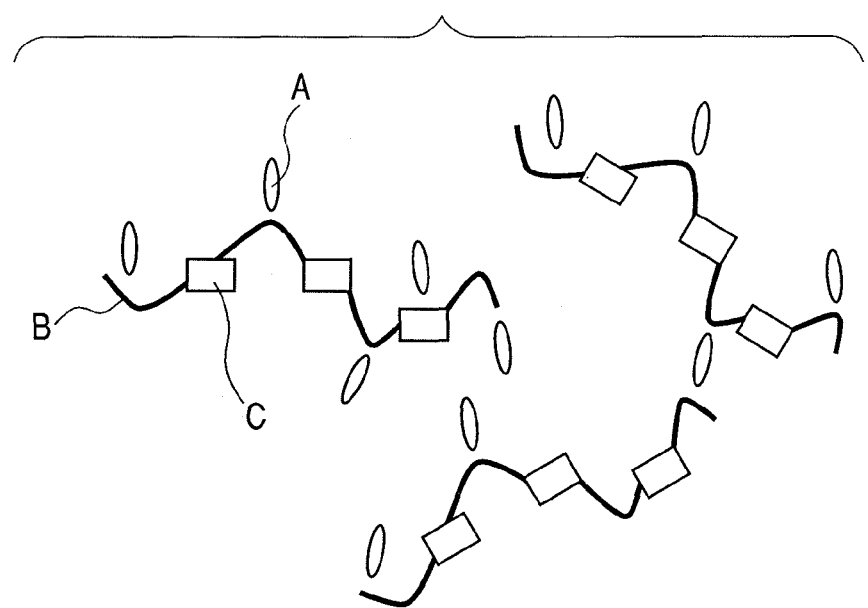
FIG. 3 is a schematic view showing the manner in which a polymer having a hydrogen bond parameter of the polymer obtained by the solubility parameter of a monomer constituting the polymer of 3.2 $cal^{0.5}/cm^{1.5}$ or less is dissolved in an aqueous medium.
Figure 4:
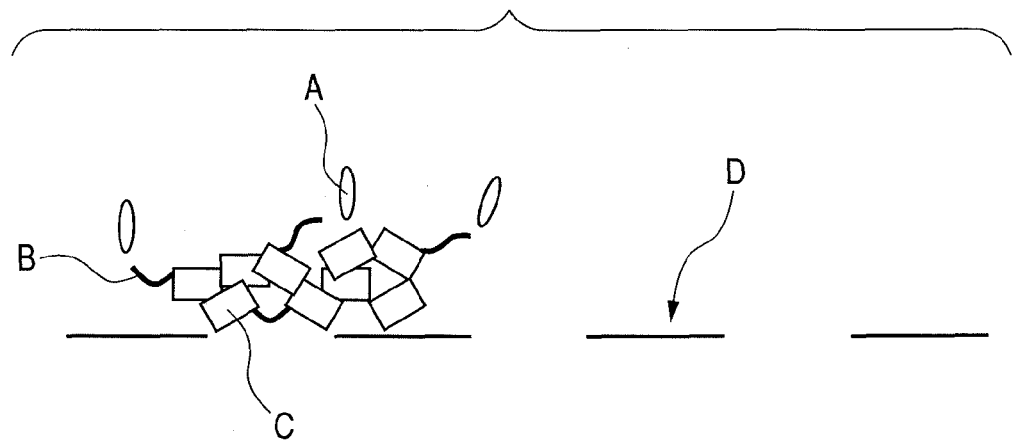
FIG. 4 is a schematic view showing the manner in which the polymer having a hydrogen bond parameter of the polymer obtained by the solubility parameter of a monomer constituting the polymer of 3.2 $cal^{0.5}/cm^{1.5}$ or less aggregates on the recording medium D.

The foregoing will be described more specifically referring to the drawings. FIG. 1 is a schematic view showing the manner in which a polymer having a hydrogen bond parameter of the polymer obtained by the solubility parameter of a monomer constituting the polymer in excess of 3.2 $cal^{0.5}/cm^{1.5}$ is dissolved in an aqueous medium. FIG. 2 is a schematic view showing the manner in which the polymer having a hydrogen bond parameter of the polymer obtained by the solubility parameter of a monomer constituting the polymer in excess of 3.2 $cal^{0.5}/cm^{1.5}$ permeates into a recording medium D. FIG. 3 is a schematic view showing the manner in which a polymer having a hydrogen bond parameter of the polymer obtained by the solubility parameter of a monomer constituting the polymer of 3.2 $cal^{0.5}/cm^{1.5}$ or less is dissolved in an aqueous medium. FIG. 4 is a schematic view showing the manner in which the polymer having a hydrogen bond parameter of the polymer obtained by the solubility parameter of a monomer constituting the polymer of 3.2 $cal^{0.5}/cm^{1.5}$ or less aggregates on the recording medium D.

As shown in FIG. 1, the polymer having a hydrogen bond parameter of the polymer obtained by the solubility parameter of a monomer constituting the polymer in excess of 3.2 $cal^{0.5}/cm^{1.5}$ has a large hydrogen bond parameter, so not only a hydrophilic portion B of the polymer but also a hydrophobic portion C of the polymer is hydrated. It should be noted that reference symbol A in the figure represents a water molecule. As a result, upon application of an ink containing the polymer to the recording medium D, even when the content of the polymer relatively increases owing to, for example, the evaporation of an aqueous medium in the ink as compared to the ink before the evaporation, the water molecules A cause hydration to part of the hydrophilic portions B. As a result, as shown in FIG. 2, the property of causing mutual aggregation of the polymer tends to reduce, so the polymer is apt to permeate into the recording medium D without aggregation on the recording medium D, and the amount of the polymer remaining on the recording medium D reduces. Investigation conducted by the inventors of the present invention has shown that, when the hydrogen bond parameter (δh) of a polymer obtained by the solubility parameter of a monomer constituting the polymer exceeds 3.2 $cal^{0.5}/cm^{1.5}$, the above tendency becomes remarkable, and an image showing sufficient scratch resistance may not be obtained.

On the other hand, as shown in FIG. 3, a polymer having a hydrogen bond parameter of the polymer obtained by the solubility parameter of a monomer constituting the polymer of 3.2 $cal^{0.5}/cm^{1.5}$ or less has a small hydrogen bond parameter, so the hydration of the water molecules A to the hydrophobic portions C of the polymer hardly occurs. As a result, upon application of an ink containing the polymer to the recording medium D, when the content of the polymer increases owing to, for example, the evaporation of an aqueous medium in the ink as compared to the ink before the evaporation, the aggregation of the polymer is not suppressed because an influence of the hydration of the water molecules A to the hydrophilic portions B of the polymer is small. As a result, as shown in FIG. 4, the aggregation of the polymer progresses, and a large amount of the polymer remains on the recording medium D, whereby an image showing sufficient scratch resistance can be obtained.

It should be noted that investigation conducted by the inventors of the present invention has shown that a polymer to be incorporated into an ink for use in ink jet recording needs to have a hydrogen bond parameter (δh) of the polymer obtained by the solubility parameter of a monomer constituting the polymer of 1.0 $cal^{0.5}/cm^{1.5}$ or more. The reason for the foregoing is as described below. When the hydrogen bond parameter (δh) of a polymer obtained by the solubility parameter of a monomer constituting the polymer is less than 1.0 $cal^{0.5}/cm^{1.5}$, the wetting phenomenon of an ejection orifice resulting from the polymer may be remarkable. As a result, the ejection property of the ink may reduce; for example, an ink droplet flies along a curved path.

Next, a relationship between the scratch resistance of the image and the acid value of a polymer, which is another condition in selecting a polymer to be incorporated into ink which can contribute to the scratch resistance of an image, will be described. According to investigation conducted by the inventors of the present invention, the above polymer has to satisfy the above-mentioned range of hydrogen bond parameter (δh) and further needs to has an acid value of 150 mgKOH/g or less. When the acid value of the polymer is 150 mgKOH/g or less, scratch resistance targeted by the present invention at such a high level that the coloring material of the image is not scraped off even when the image is lightly touched with a sharp product such as a nail can be obtained. However, when the acid value of the polymer exceeds 150 mgKOH/g, the number of the anionic groups of the polymer increases, so a buffer action on a salt or proton on a recording medium enlarges. As a result, the above-mentioned aggregation of the polymer on the recording medium is suppressed, and the proportion of the polymer remaining on the recording medium reduces, so the high scratch resistance of the image cannot be obtained in some cases.

In addition, when the acid value of the polymer which can contribute to the scratch resistance of the image is lower than 90 mgKOH/g, the polymer cannot be dissolved with an alkali in some cases, or, upon long-term storage of the ink, the polymer precipitates, and, for example, the particle size of a water-insoluble coloring material increases, so the storage stability of the ink cannot be sufficiently obtained in some cases. Further, in the case where the acid value is lower than 90 mgKOH/g, when the ink is used as an ink sufficient for obtaining high scratch resistance targeted by the present invention and is ejected according to an ink jet method involving the utilization of thermal energy, it may be difficult to maintain stable ejection properties in some cases. Accordingly, the acid value of the polymer which can contribute to the scratch resistance of the image is preferably 90 mgKOH/g or more.

As described above, the incorporation of a polymer satisfying the above two conditions into ink containing a water-insoluble coloring material such as a pigment or the like is effective in improving the scratch resistance of an image formed of the ink. That is, a polymer having an acid value of 150 mgKOH/g or less and a hydrogen bond parameter of the polymer obtained by the solubility parameter of a monomer constituting the polymer of 1.0 $cal^{0.5}/cm^{1.5}$ or more to 3.2 $cal^{0.5}/cm^{1.5}$ or less needs to be used. In addition, as described above, the acid value of the polymer is preferably 90 mgKOH/g or more. Hereinafter, a polymer satisfying the above two conditions necessary for improving the scratch resistance of an image is referred to as polymer B in contrast to a polymer A to be described later having a function with which the storage stability of ink can be relatively achieved by dispersing a water-insoluble coloring material such as a pigment into the ink.

Hereinafter, the "hydrogen bond parameter ($\delta h$) of a polymer obtained by the solubility parameter of a monomer constituting a polymer" will be explained. First, the solubility parameter will be explained. The solubility parameter is affected by a functional group kind of the compound. The solubility parameter is one of the factors determining a solubility of plural compounds or an affinity of the compounds with each other, and when the solubility parameters of these compounds are similar to each other, the solubility of them is tend to become higher. The solubility parameter is classified into a dispersion force parameter ($\delta d$) resulting from the primary deviation of an electron distribution, a polarity parameter ($\delta p$) resulting from an attractive or repulsive force generated by a dipolar moment, and a hydrogen bond parameter ($\delta h$) resulting from a hydrogen bond generated by active hydrogens or a lone pair of electrons. In the present invention, the hydrogen bond parameter is applied to a polymer, and as the hydrogen bond parameter of the polymer is large, the affinity of the polymer and water become stronger. The hydrogen bond parameter ($\delta h$) of the polymer can be determined by the solubility parameters of a monomer constituting the polymer. Then, the hydrogen bond parameter ($\delta h$) of the polymer obtained by the solubility parameter of a monomer constituting the polymer can be determined by an atomic group summation method proposed by Krevelen in which organic molecules are treated as atomic groups (see Krevelen, Properties of Polymer 2nd Edition, New York, 154 (1976)). This method is described below. First, the dispersion force parameter ($\delta d$), polarity parameter ($\delta p$), and hydrogen bond parameter ($\delta h$) of the solubility parameter are determined from a dispersion force parameter Fdi per mole, a polarity force parameter Fpi per mole, and a hydrogen bond force parameter Fhi per mole. The solubility parameter ($\delta$) can be determined by using those values as shown in the following equations:

$$\delta d = (\Sigma Fdi)/V$$

$$\delta p = (\Sigma Fpi)/V$$

$$\delta h = (\Sigma Fpi)/V$$

$$\delta = (\delta d^2 + \delta p^8 + \delta h^2)^{1/2}$$

where V represents the sum of the molar volumes of atomic groups to be determined. In the present invention, as described below, the hydrogen bond parameter ($\delta h$) of the polymer is obtained using the solubility parameters inherent in each of the monomers constituting the polymer according to the above concept.

Next, the polymer A which can particularly contribute to the storage stability of the ink will be described. The inventors of the present invention have conducted detailed investigation on a polymer capable of improving the storage stability of ink. As a result, first, the inventors have found that a block copolymer having an ethylene oxide group as a nonionic group is used as a dispersant for a water-insoluble coloring material provides excellent storage stability.

Figure 5A:
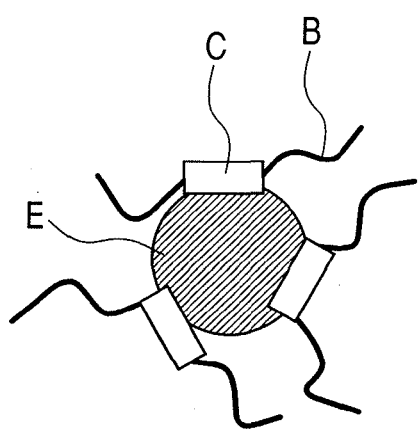
FIGS. 5A and 5B are each a schematic view showing a state where a water-insoluble coloring material (pigment) is dispersed.
Figure 5B:
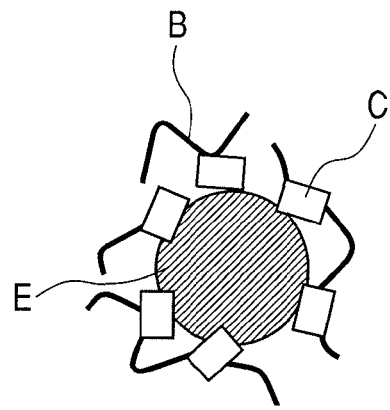

FIGS. 5A and 5B are each a schematic view showing a state where a water-insoluble coloring material (pigment) E is dispersed in ink. FIG. 5A shows the case of a block copolymer, and FIG. 5B shows the case of a random copolymer. When a block copolymer is used as a polymer, the hydrophilic portions B (nonionic groups and/or anionic groups) and the hydrophobic portions C are present as blocks. As a result, as shown in FIG. 5A, each of the hydrophobic portions C strongly adsorbs to the water-insoluble coloring material (pigment) E, and each of the hydrophilic portions B spreads into an aqueous medium to a larger extent than that in the case shown in FIG. 5B where the random copolymer is used. Therefore, the use of the block copolymer has a large dispersing effect by virtue of the steric structure of the polymer, whereby the water-insoluble coloring material hardly aggregates with each other. In this case, when a block copolymer having a nonionic group is used, even if the dispersion stability based on the electrostatic repulsion of anionic groups reduces owing to an external factor such as a salt or a pH change, the dispersion stability in the ink is extremely high, since the polymer has a nonionic group.

In view of the foregoing, the inventors of the present invention have considered that the object of the present invention can be achieved by an ink using the polymer B capable of improving the scratch resistance of an image and a polymer which is a block copolymer having a nonionic group favorably functioning as a dispersant for a water-insoluble coloring material in combination.

However, further investigation conducted by the inventors of the present invention has shown that the mere combined use of the polymer which is a block copolymer having a nonionic group and the polymer B described above cannot achieve both high scratch resistance of the image and storage stability of the ink, which is the object of the present invention, in some cases. That is, the investigation has shown that the use of both the two kinds of the polymers as ink components involves the emergence of the following new problem: properties inherent in the polymers are not exerted in some cases. In view of the foregoing, the inventors of the present invention have conducted further investigation on a cause for the emergence of the problem. As a result, the inventors have found that the degree of compatibility between those polymers is largely related to achievement of both the high scratch resistance of an image and the storage stability of ink. That is, the inventors have found that, when the compatibility between the polymers is excessively small, the properties of the polymers may cancel each other, with the result that not all the properties inherent in the respective polymers are exerted in some cases.

In view of the foregoing, the inventors of the present invention have searched for a polymer which is a block copolymer having a nonionic group and has a good compatibility with the polymer B. As a result, the inventors have found that the polymer A which is a block copolymer having an acid value of 120 mgKOH/g or more to 180 mgKOH/g or less and having an ethylene oxide group as a nonionic group has high compatibility with the polymer B. Further, the inventors have found that the polymer A out of the above two kinds of the polymers needs to relatively contribute to the dispersion of a water-insoluble coloring material in order to achieve both the high scratch resistance of an image and the good storage stability of the ink, which is the object of the present invention. Thus, the inventors have completed the present invention.

It should be noted that, in the present invention, determination as to whether the polymer A in the ink relatively contributes to the dispersion of the water-insoluble coloring material as compared to any other polymer to be used in combination can be made by the following method. First, the ink is centrifuged into a component containing the water-insoluble coloring material as a sedimented portion and a water-soluble component as a supernatant portion, and a polymer present in the component containing the water-insoluble coloring material is analyzed as described below. At that time, the centrifugation is preferably performed at 20,000 rpm for 2 hours, but the present invention is not limited to the conditions. The component containing the water-insoluble coloring material separated by the centrifugation is dispersed in water again, and hydrochloric acid or the like is added to the dispersion solution, whereby acid precipitation is performed. The precipitated product is separated by centrifugation, filtration, or the like, whereby a solid is obtained. The solid is subjected to Soxhlet extraction with an organic solvent such as tetrahydrofuran (THF), whereby a polymer is obtained. Then, the resultant polymer is analyzed by NMR measurement or the like. Which polymer adsorbs to the water-insoluble coloring material in a relatively large amount is determined by such method, whereby which polymer relatively contributes to the dispersion of the water-insoluble coloring material can be determined.

(Aqueous Ink)

Hereinafter, each component constituting an ink jet aqueous ink (which may hereinafter be simply referred to as "ink") of the present invention will be described.

(Polymer A)

In the present invention, as described above, the polymer A which is a block copolymer having an acid value of 120 mgKOH/g or more to 180 mgKOH/g or less and having an ethylene oxide group as a nonionic group is used. The polymer A needs to be a block copolymer. A method by which the block copolymer is obtained is, for example, a living anion polymerization method involving the use of n-butyllithium or the like as a polymerization initiator, a method involving performing the polymerization of a macromonomer and any other monomer, or group transfer polymerization. Of course, the present invention is not limited to those methods.

Monomers for forming the polymer A only have to include a monomer having an ethylene oxide group as a nonionic group, and any monomer except this monomer is arbitrary. Examples of a usable monomer except the monomer having an ethylene oxide group include: styrenes such as styrene and o-methylstyrene; (meth)acrylates such as methyl methacrylate and benzyl methacrylate; (meth)acrylates each having a nonionic group such as polyoxyethylene; and monomers each having an unsaturated group having an anionic group such as acrylic acid, methacrylic acid, and maleic acid.

The ratio of the ethylene oxide group constituting the polymer A with respect to the total mass of the polymer A (the mass of the ethylene oxide group/the total mass of the polymer A) is preferably 10 mass % or more to 40 mass % or less. When the ratio of the ethylene oxide group is less than 10 mass %, the extent to which the nonionic group contributes to the dispersion of the water-insoluble coloring material reduces, and the dispersion stability reduces in some cases. On the other hand, when the ratio of the ethylene oxide group exceeds 40 mass %, the affinity between the polymer and water improves, and the scratch resistance of an image may reduce in the case where the content of the polymer in the ink exceeds a certain limit.

The polymer A has a weight average molecular weight of preferably 2,000 or more to 15,000 or less, or more preferably 3,000 or more to 6,000 or less. When the weight average molecular weight is less than 2,000, the scratch resistance of the image slightly reduces in some cases. On the other hand, when the weight average molecular weight exceeds 15,000, the storage stability of the ink reduces in some cases. It should be noted that, as described in detail later, the weight average molecular weight of the polymer A is preferably smaller than that of the polymer B to be used in combination.

The content (mass %) of the polymer A in the ink is preferably 0.10 mass % or more to 5.00 mass % or less with respect to the total mass of the ink. In addition, the ratio of the content (mass %) of the polymer A with respect to the total mass of the ink to the content (mass %) of the water-insoluble coloring material with respect to the total mass of the ink (the content of the polymer A/the content of the water-insoluble coloring material) is preferably 0.20 or more. In addition, the ratio of the content (mass %) of the polymer A with respect to the total mass of the ink to the content (mass %) of the water-insoluble coloring material with respect to the total mass of the ink (the content of the polymer A/the content of the water-insoluble coloring material) is preferably 2.16 or less, or more preferably 2.00 or less. The reasons for the foregoing are as described below. Setting the content of the polymer A and the ratio of the content of the polymer A to the content of the water-insoluble coloring material into the above ranges can additionally improve the dispersion stability of the water-insoluble coloring material in the ink, and the storage stability of the ink.

(Polymer B)

The ink of the present invention is formed by using the above polymer A and the polymer B described below in combination. The polymer B needs to satisfy the following first condition: the polymer has an acid value of 150 mgKOH/g or less. At the same time, the polymer B needs to satisfy the following second condition: the polymer has a hydrogen bond parameter ($\delta h$) of the polymer obtained by the solubility parameters of monomers constituting the polymer of 1.0 cal$^{0.5}$/cm$^{1.5}$ or more to 3.2 cal$^{0.5}$/cm$^{1.5}$ or less. As long as the polymer B satisfies those conditions, the monomers constituting the polymer B, the ratio of each monomer, and the like are not particularly limited, and can be appropriately determined. In addition, as described above, the polymer B has an acid value of more preferably 90 mgKOH/g or more when the storage stability of the ink and the stable ejection property for an ink jet system involving the utilization of thermal energy are taken into consideration. Further, according to investigation conducted by the inventors of the present invention, a polymer satisfying the following condition is preferably used as the polymer B in order that the scratch resistance of the image may be additionally improved. That is, when a hydrophobic monomer is used as a component for the polymer B, and the hydrogen bond parameter ($\delta h$) of the hydrophobic monomer obtained by the solubility parameter of the monomer is 2.8 cal$^{0.5}$/cm$^{1.5}$ or less, the scratch resistance of the image can be additionally improved.

It should be noted that the hydrogen bond parameter ($\delta h$) of a polymer obtained by the solubility parameters of monomers constituting the polymer in the present invention is a value determined as described below. First, the hydrogen bond parameter ($\delta h$) of each of the monomers constituting the polymer of interest is obtained by a solubility parameter inherent in the monomers. Next, a value obtained by multiplying the hydrogen bond parameter ($\delta h$) of each of the monomers constituting the polymer by the composition (mass) ratio of the monomer constituting the polymer (the sum of the composition ratios equals 1) is determined, and obtained values are summed, whereby the hydrogen bond parameter ($\delta h$) of the polymer can be determined.

The polymer B to be used in the present invention needs to have a hydrogen bond parameter ($\delta h$) of the polymer obtained by the solubility parameters of monomers constituting the polymer determined as described above of 1.0 cal$^{0.5}$/cm$^{1.5}$ or more to 3.2 cal$^{0.5}$/cm$^{1.5}$ or less In the present invention, the value for the hydrogen bond parameter (δh) of each monomer constituting the polymer B obtained by the solubility parameter of the monomer also preferably falls within the above range.

In the ink of the present invention, the scratch resistance of the formed image can be improved more by using the polymer constituting a particular hydrophobic monomer. Specifically, in the present invention, the scratch resistance of the image can be additionally improved when a hydrophobic monomer is used as a component for the polymer B, and the hydrogen bond parameter (δh) of the hydrophobic monomer obtained by the solubility parameter of the monomer is 2.8 cal$^{0.5}$/cm$^{1.5}$ or less Here, the term "hydrophobic monomer" as used in the present invention refers to a monomer having a solubility in water of 5 g or less per 100 g of water. Any monomer can be used as the hydrophobic monomer without any particular limitation as long as the monomer satisfies this condition.

However, as the polymer B has the value of the hydrogen bond parameter (δh) of the polymer obtained by the solubility parameter of the monomer constituting the polymer is 1.0 cal$^{0.5}$/cm$^{1.5}$ or more to 3.2 cal$^{0.5}$/cm$^{1.5}$ or less, the hydrophobic monomer constituting the polymer B is preferably a hydrophobic monomer having a hydrogen bond parameter of the monomer obtained by the solubility parameter of the monomer of 3.2 cal$^{0.5}$/cm$^{1.5}$ or less, and a hydrophobic monomer having a hydrogen bond parameter of the monomer obtained by the solubility parameter of the monomer of 2.8 cal$^{0.5}$/cm$^{1.5}$ or less is more preferably used. In addition, a hydrophobic monomer having a hydrogen bond parameter of the monomer obtained by the solubility parameter of the monomer of 0.0 cal$^{0.5}$/cm$^{1.5}$ or more is preferably used. Examples of the hydrophobic monomer having a hydrogen bond parameter of the hydrophobic monomer obtained by the solubility parameter of the monomer of 0.0 cal$^{0.5}$/cm$^{1.5}$ or more to 3.2 cal$^{0.5}$/cm$^{1.5}$ or less include styrene, α-methylstyrene, ethyl acrylate, n-butyl acrylate, n-hexyl acrylate, and benzyl methacrylate. When the hydrophobic portion of the polymer is formed of two or more kinds of monomers, the monomers to be used only have to be selected in such a manner that the weighted average of the hydrogen bond parameters of the respective monomers is preferably 3.2 cal$^{0.5}$/cm$^{1.5}$ or less, or more preferably 2.8 cal$^{0.5}$/cm$^{1.5}$ or less.

A monomer except the hydrophobic monomer which can be used as a component for the polymer B is, for example, an acrylic monomer having an anionic group Specific examples of the usable monomer include: monomers each having a carboxyl group, such as acrylic acid, methacrylic acid, crotonic acid, ethacrylic acid, propylacrylic acid, isopropylacrylic acid, itaconic acid, and fumaric acid; monomers each having a sulfonic group, such as styrenesulfonic acid, sulfonic acid-2-propylacrylamide, acrylic acid-2-ethyl sulfonate, methacrylic acid-2-ethyl sulfonate, and butylacrylamide sulfonic acid; and monomers each having a phosphonic group, such as methacrylic acid-2-ethyl phosphonate and acrylic acid-2-ethyl phosphonate.

In the present invention, for example, an acrylic polymer can be used as the polymer B; the acrylic polymer can be obtained by polymerizing such acrylic monomer as described above in an organic solvent such as, for example, xylene by using a radical polymerization initiator. An azo-based initiator, a peroxide-based initiator, or the like can be used as the polymerization initiator in this case.

According to investigation conducted by the inventors of the present invention, the case where the monomers constituting the polymer B to be used in the ink of the present invention include at least n-butyl acrylate is preferable because compatibility between the polymer B and the polymer A improves, and the storage stability of the ink and the scratch resistance of the image can be additionally improved. Further, the use of a copolymer having both n-butyl acrylate and styrene in a hydrophobic portion of the polymer B can provide an ink having an additionally excellent improving effect particularly on the scratch resistance of the image. In this case, the polymer B to be used preferably has the following copolymerization ratio between styrene and n-butyl acrylate: the mass ratio of n-butyl acrylate with respect to styrene (n-butyl acrylate/styrene) in the monomers constituting the polymer B is preferably in the range of 0.10 or more to 0.50 or less. Further, the mass ratio of n-butyl acrylate with respect to styrene (n-butyl acrylate/styrene) is particularly preferably more than 0.25 and less than 0.35.

The polymer B to be used in the present invention preferably has a weight average molecular weight larger than the weight average molecular weight of the polymer A. When the weight average molecular weight of the polymer B is equal to or smaller than that of the polymer A, the scratch resistance of the image cannot be sufficiently obtained in some cases. This is because, as in the case of the behavior of a polymer having a large hydrogen bond parameter of the polymer obtained by the solubility parameter of a monomer constituting the polymer as described in the description of FIG. 2, the polymer B is apt to permeate into a recording medium, and the amount of the polymer B remaining on the recording medium reduces in some cases. In addition, the weight average molecular weight of the polymer B is preferably 5,000 or more. This is because, when the weight average molecular weight is less than 5,000, the property of causing mutual aggregation of the polymer tends to reduce, and the scratch resistance of the image cannot be sufficiently obtained in some cases owing to a reason similar to that described above.

Further, the weight average molecular weight of the polymer B to be used in the present invention is preferably 5,000 or more to 15,000 or less, or more preferably 6,000 or more to 9,000 or less. When the weight average molecular weight is less than 5,000, as described above, sufficient scratch resistance cannot be obtained in some cases. On the other hand, a weight average molecular weight in excess of 15,000 is not preferable because, when the ink is used as an ink jet ink, the viscosity of the ink increases, so the ejection stability of the ink reduces in some cases. It should be noted that, as described above, the weight average molecular weight of the polymer B is preferably larger than that of the polymer A to be used in combination.

The structure of the polymer B is preferably a random copolymer. A block copolymer or graft copolymer applicable to an aqueous ink generally has such a structure that the hydrophobic portion and the hydrophilic portion are localized, and, furthermore, the surface of the water-insoluble coloring material such as a pigment is hydrophobic. Accordingly, when the structure of the polymer is a graft copolymer or a block copolymer, the surface of the water-insoluble coloring material and the hydrophobic portion of the polymer are apt to cause a hydrophobic-hydrophobic interaction, and the polymer having a graft copolymer structure or a block copolymer structure may be apt to adsorb to the water-insoluble coloring material. For the foregoing reason, when the structure of the polymer B is a block copolymer or a graft copolymer, the polymer B becomes apt to adsorb to the water-insoluble coloring material preceding the polymer A which contributes to the dispersion of the water-insoluble coloring material. Then, the polymer A which has originally contributed to the dispersion of the water-insoluble coloring material is brought into a state of being isolated in the ink. However, the polymer A has high hydrophilicity and low aggregatability, so an effect of generating aggregatability of the polymer B reduces, and the scratch resistance of the image cannot be sufficiently obtained in some cases. Accordingly, the structure of the polymer B is more preferably a random copolymer.

The content (mass %) of the polymer B in the ink is preferably 0.5 mass % or more to 5.0 mass % or less, or more preferably 1.0 mass % or more to 4.0 mass % or less with respect to the total mass of the ink. Setting the content of the polymer B into the above range can satisfy the storage stability of the ink containing the water-insoluble coloring material, and can leave, on the recording medium, the polymer in such an amount that an improving effect on the scratch resistance of an image formed of the ink is sufficiently exerted. Further, the wetting phenomenon of an ejection orifice due to the polymer can be suppressed, so the ink becomes hardly susceptible to a reduction in ejection properties such as generation of an ink droplet flying along a curved path while the ink contains the polymer.

In addition, in the composition of the ink of the present invention, the ratio of the content (mass %) of the polymer B with respect to the total mass of the ink to the content (mass %) of the water-insoluble coloring material with respect to the total mass of the ink (the content of the polymer B/the content of the water-insoluble coloring material) is preferably 1.20 or more. In particular, when the content of the water-insoluble coloring material is 1.2 mass % or less, the ratio of the content of the polymer B to the content of the water-insoluble coloring material is preferably 3.00 or more. The inventors of the present invention consider the reason why the ratio of the content of the polymer B to the content of the water-insoluble coloring material in the ink is preferably 3.00 or more as described above when the content of the water-insoluble coloring material is small to be as described below.

Figure 6:
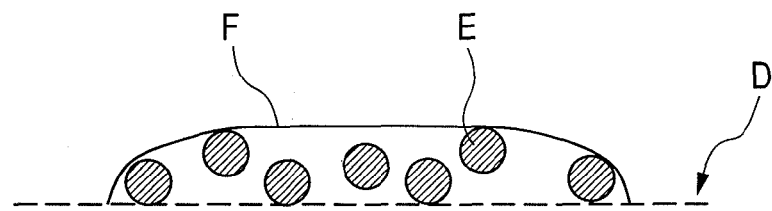
FIG. 6 is a schematic view showing the section of an image formed of an ink containing a small amount of a water-insoluble coloring material.
Figure 7:
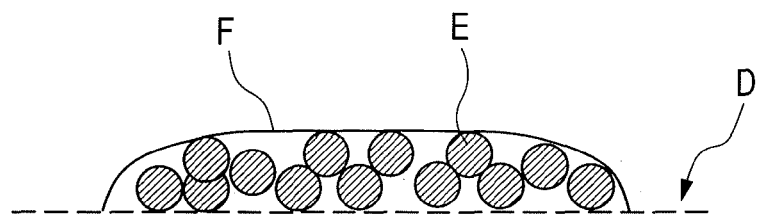
FIG. 7 is a schematic view showing the section of an image formed of an ink containing a large amount of a water-insoluble coloring material.

FIG. 6 is a schematic view showing the section of an image formed of an ink containing a small amount of a water-insoluble coloring material E. In addition, FIG. 7 is a schematic view showing the section of an image formed of an ink containing a large amount of the water-insoluble coloring material E. As shown in FIGS. 6 and 7, the image formed of the ink containing a small amount of the water-insoluble coloring material E has a smaller amount of the water-insoluble coloring material E with respect to a polymer than that of the image formed of the ink containing a large amount of the water-insoluble coloring material E. Accordingly, the filler-like effect of the water-insoluble coloring material E reduces, so the strength of a film F formed of the polymer may be small. Accordingly, when the content of the water-insoluble coloring material E is small, an additionally large amount of the polymer B having a function of forming the film F is needed.

It should be noted that, in the ink of the present invention, the ratio of the content (mass %) of the polymer B with respect to the total mass of the ink to the content (mass %) of the water-insoluble coloring material with respect to the total mass of the ink preferably falls within the following range. That is, the ratio of the content (mass %) of the polymer B with respect to the total mass of the ink to the content (mass %) of the water-insoluble coloring material with respect to the total mass of the ink (polymer B/water-insoluble coloring material) is preferably 1.00 or more to 5.00 or less, or more preferably 1.20 or more to 5.00 or less. In particular, when the content of the water-insoluble coloring material is 1.2 mass % or less, the ratio of the content of the polymer B to the content of the water-insoluble coloring material is preferably 3.00 or more to 5.00 or less. In the present invention, the strength of the film may be additionally improved via the above mechanism as long as the ratio satisfies at least such range.

Further, in the ink of the present invention, the ratio of the total of the content (mass %) of the polymer A and the content (mass %) of the polymer B with respect to the total mass of the ink to the content (mass %) of the water-insoluble coloring material with respect to the total mass of the ink preferably falls within the following range. That is, the ratio of the total of the content (mass %) of the polymer A and the content (mass %) of the polymer B with respect to the total mass of the ink to the content (mass %) of the water-insoluble coloring material with respect to the total mass of the ink ((polymer A+polymer B)/water-insoluble coloring material) is preferably 1.20 or more The reason for the foregoing is as described below. Setting the total of the content (mass %) of the polymer A and the content (mass %) of the polymer B into the above range can cause the polymers to sufficiently include the aggregate of the water-insoluble coloring material present on the recording medium, so an ink capable of additionally improving the scratch resistance of the image can be obtained, provided that the above ratio ((polymer A+polymer B)/water-insoluble coloring material) is preferably 5.00 or less because the ejection property of the ink tends to reduce when the contents of the polymers in the ink excessively increase.

Further, the total of the content (mass %) of the polymer A and the content (mass %) of the polymer B with respect to the total mass of the ink is preferably 1.5 mass % or more, provided that the total of the content (mass %) of the polymer A and the content (mass %) of the polymer B with respect to the total mass of the ink is preferably 5.0 mass % or less because the ejection property of the ink tends to reduce when the contents of the polymers in the ink excessively increase.

Further, in order to obtain sufficient scratch resistance of the image, the ratio between the contents of the polymer A and the polymer B in the ink is preferably set as described below. That is, the ratio of the content (mass %) of the polymer B with respect to the total mass of the ink to the content (mass %) of the polymer A with respect to the total mass of the ink (polymer B/polymer A) is preferably 1.0 or more, or more preferably 1.2 or more, provided that the ratio of the content (mass %) of the polymer B to the content (mass %) of the polymer A (polymer B/polymer A) is preferably 25.0 or less in order to obtain further good storage stability of the ink.

(Aqueous Medium)

An aqueous medium such as water or a mixed solvent of water and a water-soluble organic solvent can be used in the ink of the present invention. The content (mass %) of the water-soluble organic solvent in the ink is preferably 3.0 mass % or more to 50.0 mass % or less with respect to the total mass of the ink.

The water-soluble organic solvent is not particularly limited as long as the solvent is water-soluble, and one kind of those described below may be used, or two or more kinds of them may be used in combination. To be specific, for example, any one of the following water-soluble organic solvents can be used: alkyl alcohols each having 1 to 4 carbon atoms such as methanol, ethanol, n-propanol, isopropanol, n-butanol, sec-butanol, and tert-butanol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols having an alkylene group and having 2 to 6 carbon atoms, such as ethylene glycol, propylene glycol, butylene glycol, triethylene glycol, 1,2,6-hexane triol, thio diglycol, hexylene glycol, and diethylene glycol; alkyl ether acetates such as polyethylene glycol monomethyl ether acetate; glycerin; alkyl ethers of polyhydric alcohols, such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone.

Deionized water (ion exchanged water) is desirably used as water. The water content (mass %) in ink is preferably in the range of 50.0 mass % or more to 95.0 mass % or less with respect to the total mass of the ink.

(Water-Insoluble Coloring Material)

A water-insoluble coloring material that can be dispersed by using a dispersant can be used as the water-insoluble coloring material to be incorporated into the ink of the present invention. Specific examples of a usable water-insoluble coloring material include: inorganic pigments such as calcium carbonate and titanium oxide; organic pigments such as phthalocyanine and quinacridone; and carbon black. The content (mass %) of the water-insoluble coloring material in the ink is preferably 0.1 mass % or more to 15.0 mass % or less, or more preferably 0.2 mass % or more to 10.0 mass % or less with respect to the total mass of the ink.

Any carbon black such as Furnace Black, Lamp Black, Acetylene Black or Channel Black are preferably used as the water-insoluble coloring material in the black ink. Specifically, for example, any of the following commercially available products may be used.

Raven: 1170, 1190 ULTRA-II, 1200, 1250, 1255, 1500, 2000, 3500, 5000 ULTRA, 5250, 5750, and 7000 (manufactured by Columbian Chemicals Co.); Black Pearls L, Regal: 330R, 400R, and 660R, Mogul L, Monarch: 700, 800, 880, 900, 1000, 1100, 1300, 1400, and 2000, and Vulcan XC-72R (manufactured by Cabot Corporation); Color Black FW1, FW2, FW2V, FW18, FW200, S150, S160, and S170, Printex: 35, U, V, 140U, 140V; Special Black: 6, 5, 4A, and 4 (manufactured by Degussa Corporation); and No. 25, No. 33, No. 40, No. 47, No. 52, No. 900, No. 2300, MCF-88, MA600, MA7, MA8, and MA100 (manufactured by Mitsubishi Chemical Corporation).

Further, newly prepared carbon black may be also used. Of course, the present invention is not limited to the above and any conventional carbon black may be used. Further, the water-insoluble coloring material is not limited to carbon black and magnetic fine particles such as magnetite, ferrite, and titanium black may also be used.

An organic pigment is preferably used as the water-insoluble colorant in the color ink. Specifically, for example, any of the following may be used.

Water-insoluble azo pigments such as toluidine red, toluidine maroon, Hansa yellow, benzidine yellow, and pyrazolone red; water-soluble azo pigments such as lithol red, helio bordeaux, pigment scarlet, and permanent red 2B; derivatives of vat dyes, such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole pigments; flavanthrone yellow; acylamide yellow; quinophthalone yellow; nickel azo yellow; copper azo methine yellow; perinone orange; anthrone orange; dianthraquinonyl red; and dioxazine violet. Of course, the present invention is not limited thereto.

Further, examples of the organic pigment represented by a color index (C.I.) number that can be used include the following. C.I. Pigment Yellow: 12, 13, 14, 17, 20, 24, 74, 83, 86, 93, 97, 109, 110, 117, 120, 125, and 128; C.I. Pigment Yellow 137, 138, 147, 148, 150, 151, 153, 154, 166, 168, 180, and 185; C.I. Pigment Orange: 16, 36, 43, 51, 55, 59, 61, and 71; C.I. Pigment Red: 9, 48, 49, 52, 53, 57, 97, 122, 123, 149, 168, and 175; C.I. Pigment Red 176, 177, 180, 192, 215, 216, 217, 220, 223, 224, 226, 227, 228, 238, 240, 254, 255, and 272; C.I. Pigment Violet: 19, 23, 29, 30, 37, 40, and 50; C.I. Pigment Blue: 15, 15:1, 15:3, 15:4, 15:6, 22, 60, and 64; C.I. Pigment Green: 7 and 36; and C.I. Pigment Brown: 23, 25, and 26. Of course, the present invention is not limited thereto.

(Dispersant)

A polymer dispersant is preferably used as a dispersant for dispersing the water-insoluble coloring material in the aqueous medium. In the present invention, the polymer A described above is preferably used as the dispersant. However, some polymer except the polymer A may be used as the dispersant to such an extent that the use of the polymer exerts an effect, and an effect of the present invention is not impaired. When some polymer except the polymer A is used as a dispersant, the weight average molecular weight of the dispersant is preferably 1,000 or more to 30,000 or less, or more preferably 3,000 or more to 7,000 or less The monomer constituting the dispersant except the polymer A is specifically any one of those described below; a polymer formed of at least two monomers thereof is a good example, and, in this case, at least one of the monomers is preferably a hydrophilic monomer Examples of the monomer include styrene, vinylnaphthalene, an aliphatic alcohol ester of $\alpha,\beta$-ethylenic unsaturated carboxylic acid, acrylic acid, maleic acid, itaconic acid, fumaric acid, vinyl acetate, vinyl pyrrolidone, acrylamide, and derivatives thereof. Further, examples of the polymer composition include a block copolymer, a random copolymer, a graft copolymer, and salts thereof. Further, a natural polymer such as rosin, shellac, or starch may also be used. Those polymers are soluble in an aqueous solution in which a base is dissolved, and also soluble in alkali.

(Other Components)

The ink of the present invention may use a moisture-retaining solid content such as urea, a urea derivative, trimethylolpropane, or trimethylolethane as well as the above components. The content (mass %) of the moisture-retaining solid content in the ink is generally in the range of 0.1 mass % or more to 20.0 mass % or less, or more preferably 3.0 mass % or more to 10.0 mass % or less with respect to the total mass of the ink.

Further, when preparing the ink of the present invention, in order to obtain an ink with desired physical properties, the ink may contain various additives such as a surfactant, a pH regulator, a rust-preventive agent, a preservative, a fungicide, an antioxidant, or a reduction inhibitor, if required. In particular, any one of the surfactants such as an anionic surfactant, a nonionic surfactant, and an amphoteric surfactant can be used as the surfactant. To be specific, any one of polyoxyethylene alkyl ethers, polyoxyethylene alkyl phenols, acetylene glycol compounds, ethylene oxide adducts of acetylene glycol, and the like can be used. In the present invention, any one of the polyoxyethylene alkyl ethers and the ethylene oxide adducts of acetylene glycol is particularly preferably used as the surfactant.

(Ink Jet Recording Method)

The ink of the present invention is particularly suitably used for an ink jet recording method involving ejecting the ink and recording on a recording medium by means of an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the ink of the present invention.

(Ink Cartridge)

An ink cartridge of the present invention includes an ink storage portion for storing ink, and is characterized in that the ink stored in the ink storage portion is the above ink of the present invention.

(Recording Unit)

A recording unit of the present invention includes: an ink storage portion for storing ink; and a recording head for ejecting the ink, and is characterized in that the ink stored in the ink storage portion is the above ink of the present invention. In particular, a recording unit in which the recording head ejects the ink by causing thermal energy to act on the ink is more preferable.

(Ink Jet Recording Apparatus)

An ink jet recording apparatus of the present invention includes: an ink storage portion for storing ink; and a recording head for ejecting the ink, and is characterized in that the ink stored in the ink storage portion is the above ink of the present invention. In particular, an ink jet recording apparatus in which the recording head ejects the ink by causing thermal energy to act on the ink is more preferable.

Figure 8:
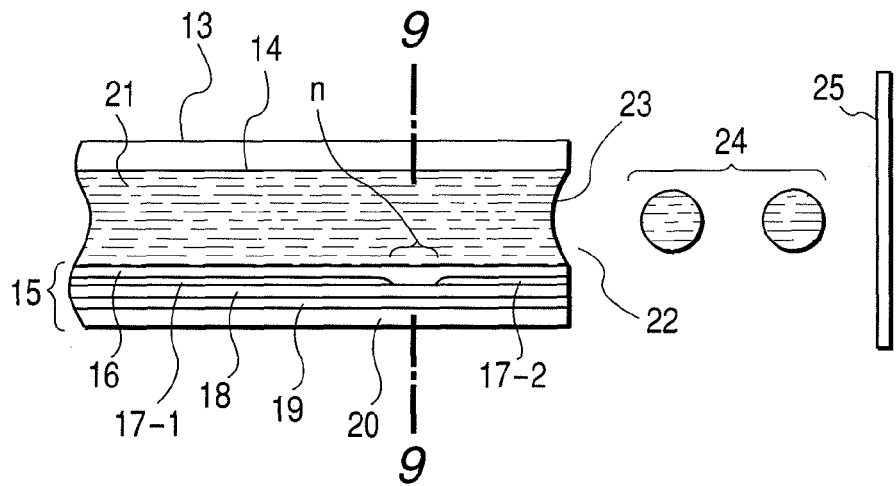
FIG. 8 is a longitudinal sectional view of a recording head.
Figure 9:
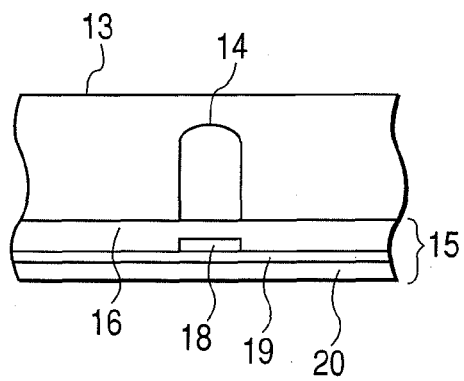
FIG. 9 is a transverse sectional view of the recording head.

An example of an ink jet recording apparatus in which the ink of the present invention can be used will be described below; the ink of the present invention is applicable to an ink jet recording method according to any type. First, an ink jet recording apparatus according to an ink jet recording method involving the utilization of thermal energy will be described. FIGS. 8 and 9 each show an example of the constitution of a recording head serving as a main portion of the apparatus. FIG. 8 is a sectional view of a recording head 13 along an ink flow path, and FIG. 9 is a sectional view taken along the line 9-9 of FIG. 8. The recording head 13 is comprised of a member having an ink flow path (nozzle) 14 and a heating element substrate 15. The heating element substrate 15 is comprised of a protective layer 16, electrodes 17-1 and 17-2, a heating resistor layer 18, a heat storage layer 19, and a substrate 20.

When a pulse-shaped electric signal is applied to the electrodes 17-1 and 17-2 of the recording head 13, an area represented by "n" of the heat generating element substrate 15 generates heat rapidly. Then, bubbles are generated in an ink 21 that is in contact with the surface of the area. Then, a meniscus 23 projects due to the pressure of the bubbles and the ink 21 as an ink droplet 24 is ejected through an ejection orifice 22 of the nozzle 14 toward a recording medium 25.

Figure 10:
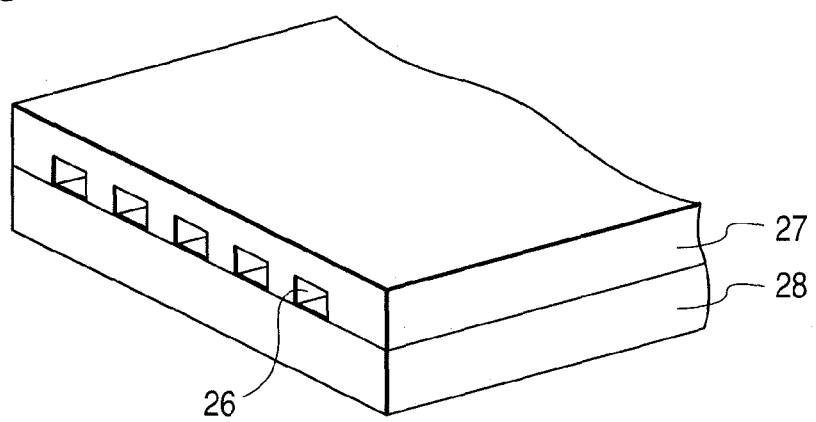
FIG. 10 is a perspective view of a recording head obtained by arranging multiple recording heads each shown in FIG. 8.

FIG. 10 is a view showing an external appearance of an example of a multi-head in which a number of heads shown in FIG. 8 are arranged. The multi-head is comprised of a glass plate 27 having a multi-nozzle 26 and a recording head 28 that is the same as that described in FIG. 8.

Figure 11:
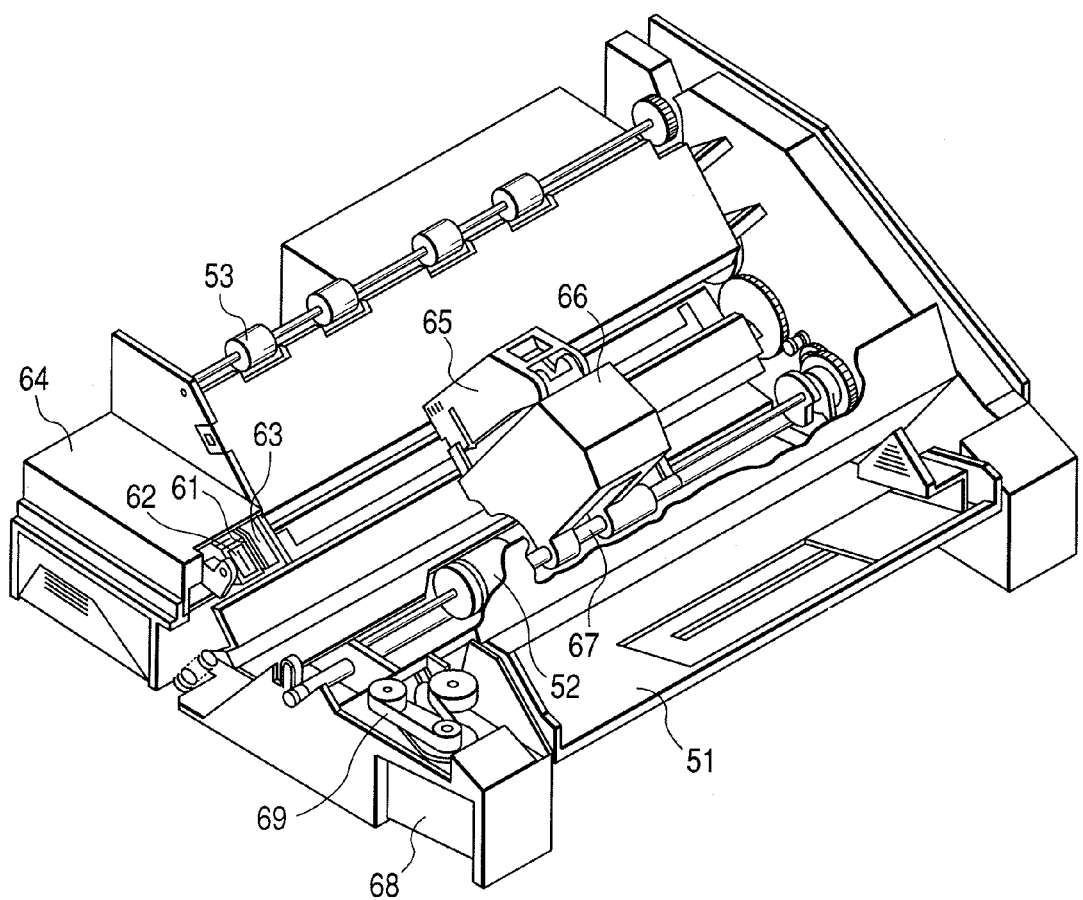
FIG. 11 is a perspective view showing an example of an ink jet recording apparatus.

FIG. 11 is perspective view of an example of an ink jet recording apparatus incorporating the recording head described above. Reference numeral 61 denotes a blade as a wiping member. An end of the blade 61 is fixed while held by a blade holding member to form a cantilever. The blade 61 is placed at a position adjacent to a recording area by a recording head 65. The blade 61 is held in the form of projecting to the movement path of the recording head 65.

Reference numeral 62 denotes a cap of a ejection orifice surface of the recording head 65. The cap 62 is placed at a home position adjacent to the blade 61 and moves in a direction perpendicular to the movement direction of the recording head 65 to abut against the ink ejection port surface to perform capping. Reference numeral 63 denotes an ink absorber provided adjacent to the blade 61. The ink absorber 63 is held so as to be in the form of projection to the movement path of the recording head 65 in the same manner as in the blade 61. The ejection recovering portion 64 is formed with the blade 61, the cap 62, and the ink absorber 63. Moisture, dust, and the like are removed from the ejection orifice surface by the blade 61 and the ink absorber 63.

Reference number 65 denotes a recording head that has an ejection energy generating unit and performs recording by ejecting ink to a recording medium opposed to the ejection orifice surface provided with an ejection port. Reference numeral 66 denotes a carriage for carrying the recording head 65 to move it. The carriage 66 is slidably engaged with a guide shaft 67, and a part of the carriage 66 is connected (not shown) to a belt 69 driven by a motor 68. With this arrangement, the carriage 66 can move along the guide shaft 67, and the recording head 65 can move through the recording area and an area adjacent thereto.

Reference numeral 51 denotes a paper feed portion for inserting a recording medium, and 52 denotes a paper feed roller driven with a motor (not shown). Due to these configurations, the recording medium is supplied to a position opposed to the ejection orifice surface of the recording head 65, and is delivered to a paper delivery portion provided with a delivery roller 53 according as recording proceeds. When the recording head 65 returns to the home position after completing recording, the cap 62 of the ejection recovering portion 64 is retracted from the movement path of the recording head 65, whereas the blade 61 projects to the movement path. Thus, the ejection orifice of the recording head 65 is wiped.

When the cap 62 performs capping by abutting against the ejection orifice surface of the recording head 65, the cap 62 moves so as to project to the movement path of the recording head 65. In the case where the recording head 65 moves from the home position to a recording start position, the cap 62 and the blade 61 are placed at the same position as that for wiping. Consequently, even in this movement, the ejection orifice surface of the recording head 65 is wiped. The above-mentioned movement of the recording head 65 to the home position does not occur only at the completion of recording or at a time of ejection recovery. The recording head moves to the home position adjacent to the recording area at a predetermined interval while moving through the recording area for recording, and the wiping is performed along with this movement.

Figure 12:
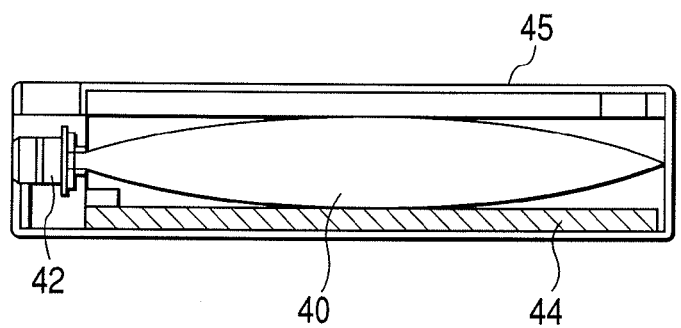
FIG. 12 is a longitudinal sectional view of an ink cartridge.

FIG. 12 is a view showing an example of an ink cartridge containing ink supplied to a recording head via an ink supply member (e.g., a tube). In FIG. 12, reference numeral 40 denotes an ink containing portion (e.g., an ink bag) containing an ink for supply, and a rubber plug 42 is provided at an end of the ink containing portion 40. By inserting a needle (not shown) into the plug 42, ink in the ink bag 40 can be supplied to the recording head. Reference numeral 44 denotes an ink absorber for receiving waste ink.

Figure 13:
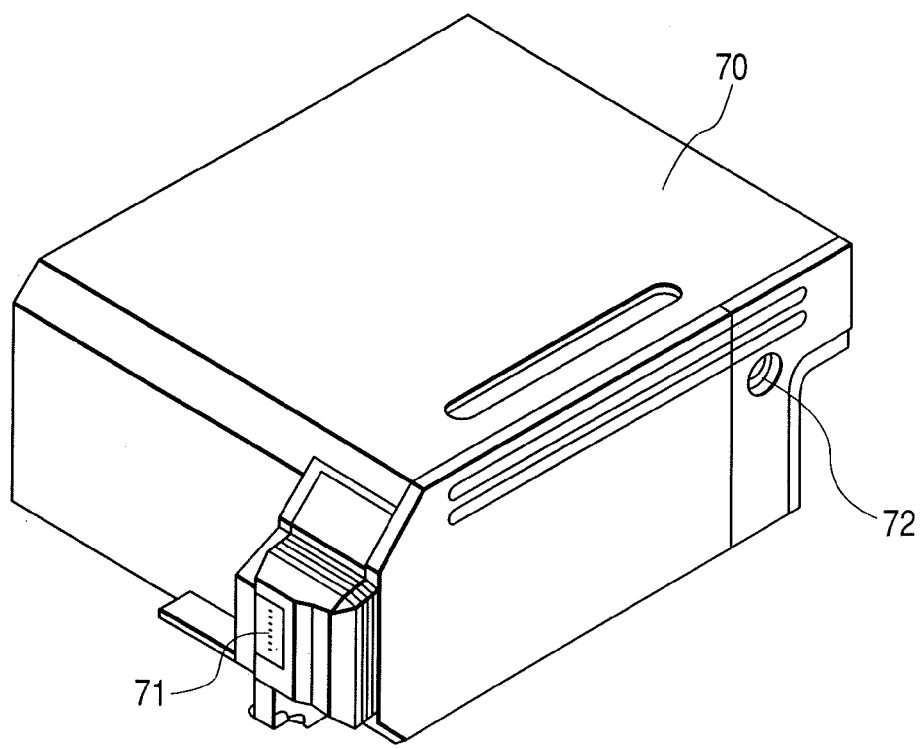
FIG. 13 is a perspective view showing an example of a recording unit.

The ink jet recording apparatus using the ink of the present invention is not limited to a configuration in which a recording head and an ink cartridge are separately provided. The ink jet recording apparatus may also be used in a configuration in which the head and the ink cartridge are integrated, as shown in FIG. 13. In FIG. 13, reference numeral 70 denotes a recording unit. In the recording unit 70, an ink containing portion containing ink (e.g., an ink absorber) is contained, and ink in the ink absorber is ejected from a recording head portion 71 having a plurality of ejection ports as ink droplets. Further, instead of using the ink absorber, an ink bag in which an ink containing portion includes a spring or the like may be used. Reference numeral 72 denotes an atmosphere communication port for allowing the inside of the cartridge to communicate with the atmosphere. The recording unit 70 is used in place of the recording head 65 shown in FIG. 11, and is detachably attachable to the carriage 66.

Figure 14:
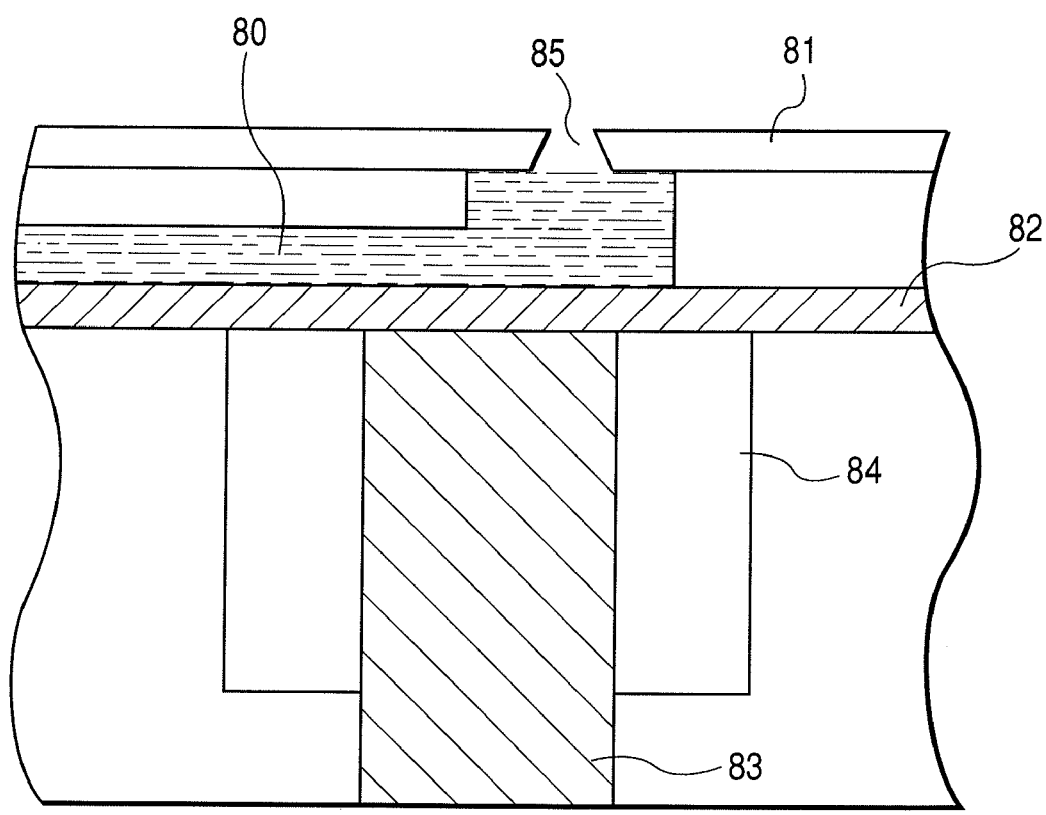
FIG. 14 is a schematic view showing an example of the constitution of a recording head.

The ink of the present invention is not limited to be used in the ink jet recording method or recording apparatus as described above and may preferably be used in an ink jet recording apparatus having a recording head using mechanical energy to eject ink. Next, an ink jet recording apparatus utilizing mechanical energy will be described. The apparatus is characterized by including a nozzle-formed substrate having a plurality of nozzles, a pressure generating element made of a piezoelectric material and a conductive material, and ink filling the periphery of the pressure generating element. The apparatus is also characterized by displacing the pressure generating element by an applied voltage and including a recording head ejecting ink droplets from the ejection orifice. FIG. 14 is a schematic figure showing an example of a configuration of a recording head that is a main portion of the recording head. The recording head comprised of an ink flow path 80 communicated with an ink chamber, an orifice plate 81, a vibration plate 82 for applying a pressure to ink, a piezoelectric element 83 that is connected to the vibration plate 82 and is displaced by an electric signal, and a substrate 84 for supporting the orifice plate 81 and the vibration plate 82. In this recording method, ink droplets are ejected from the ejection orifice 85 of the orifice plate 81 by using a strain stress generated by applying a pulse-shaped voltage to the piezoelectric element 83 which deforms the vibration plate connected to the piezoelectric element 83, and thereby pressurizing the ink in the ink flow path 80. Such a recording head may be used while incorporated in the ink jet recording apparatus similar to that shown in FIG. 9.

(Image)

An image of the present invention is an image formed on a recording medium by ejecting ink according to an ink jet system, wherein the ink is the aqueous ink according to the above ink of the present invention.

EXAMPLES

Hereinafter, the present invention will be described in more detail by way of examples, comparative examples, and reference examples. The present invention is by no means limited by the following examples unless departing from the gist of the present invention. It should be noted that, in the following description, unless otherwise stated, the terms "part(s)" and "%" refer to "part(s) by mass" and "mass %", respectively, a hydrogen bond parameter ($\delta h$) is represented with "cal$^{0.5}$/cm$^{1.5}$", and an acid value is represented with "mgKOH/g". In addition, all values of copolymerization ratios between polymers each are of mass ratio. In addition, the hydrogen bond parameter ($\delta h$) of a polymer obtained by the solubility parameter of a monomer constituting the polymer was described as "polymer $\delta h$", and the hydrogen bond parameter ($\delta h$) of a hydrophobic monomer obtained by the solubility parameter of the monomer was described as "hydrophobic monomer $\delta h$".

(Preparation of Ink)

The respective inks of the examples, the comparative examples, and the reference examples were each prepared by the following procedure. Carbon black used for the preparation of each ink has an average particle size of 95 nm. "Acetylenol EH" is a surfactant manufactured by Kawaken Fine Chemicals Co., Ltd., and its specific structure is an ethylene oxide adduct of acetylene glycol. In addition, "BC20" is a polyoxyethylene-alkyl-ether-based surfactant manufactured by Nihon Surfactant Kogyo K.K. The term "content of a solid" in the following description refers to the content of a polymer when the polymer is of a salt type. Upon preparation of each ink, a polymer used as a component for a pigment dispersion solution 1 to 14 was defined as the polymer A, a polymer used as a component for a polymer aqueous solution 1 to 24 was defined as the polymer B, and the main properties of these polymers were collectively shown in table 2 to 9. Here, the block copolymer used as the polymer A in any example was a block copolymer having an ethylene oxide group as a nonionic group, the ratio of the ethylene oxide group constituting the polymer A with respect to the total mass of the polymer A was described as "EO group ratio". In addition, when the polymer B contained styrene and n-butyl acrylate as monomers, the value of the mass ratio of n-butyl acrylate with respect to styrene in the monomers constituting the polymer B was described as "n-BA/St mass ratio".

Example 1

Pigment Dispersion Solution 1 obtained by dispersing carbon black as described below was obtained. First, 37.5 mass % of a 20.0-mass % polymer aqueous solution obtained by neutralizing Block Copolymer 1 with 1 equivalent of potassium hydroxide, 15.0 mass % of carbon black, and 47.5 mass % of water were mixed. Next, the mixture was sufficiently dispersed with a paint shaker using glass beads, whereby Pigment Dispersion Solution 1 (the content of the pigment was 15.0 mass % and the content of the polymer A was 7.5 mass %) was obtained.

Block Copolymer 1 used in this example has a ratio of "styrene/methoxytriethylene glycol methacrylate/acrylic acid" of 0.398/0.422/0.180, an acid value of 140, and a weight average molecular weight of 4,000. In addition, the EO group ratio in Block Copolymer 1 is 24 mass %.

In addition, Polymer Aqueous Solution 1 was obtained as described below. 15.0 mass % of Polymer 1 comprised of styrene, ethyl acrylate, and acrylic acid, 1 equivalent of potassium hydroxide with respect to a carboxylic acid constituting acrylic acid of the polymer were added to water so that the mixture totals 100.0 mass %. Then, the resultant was stirred at 80° C., whereby Polymer 1 was dissolved. After that, water was added to adjust the content of the solid (Polymer B) to 15.0 mass %, whereby Polymer Aqueous Solution 1 was obtained.

Polymer 1 used in this example has a ratio of "styrene/ethyl acrylate/acrylic acid" of 0.234/0.650/0.116, an acid value of 90, a weight average molecular weight of 7,000, a polymer $\delta h$ of 3.2, and a hydrophobic monomer $\delta h$ of 2.9.

The following components containing Pigment Dispersion Solution 1 obtained in the foregoing and Polymer Aqueous Solution 1 were sufficiently mixed. After that, the mixture was further filtrated, whereby an ink was prepared.

| | |
|---|---|
| Pigment Dispersion Solution 1 | 16.7 mass % |
| Polymer Aqueous Solution 1 | 16.7 mass % |
| Glycerin | 5.0 mass % |
| Ethylene urea | 9.0 mass % |
| BC20 | 1.5 mass % |
| Acetylenol EH | 0.5 mass % |
| Water | 50.6 mass % |

The ink obtained in the foregoing was subjected to the following test. The ink was centrifuged (at 20,000 rpm for 2 hours), whereby a coloring material was separated, and a sedimented portion was collected. The sedimented portion was dispersed in water again, whereby a dispersion containing a pigment was obtained. An aqueous solution of hydrochloric acid was added to the dispersion solution until the mixture had a pH of 2 or less, and then an aggregate was collected. The aggregate was subjected to Soxhlet extraction with tetrahydrofuran (THF), and THF was removed by distillation, whereby a polymer component was obtained. The resultant polymer component was subjected to NMR measurement. As a result, a styrene-acrylic acid block copolymer having an ethylene oxide group as a nonionic group was detected in a larger amount than that of a polymer containing ethyl acrylate and acrylic acid. The foregoing confirmed that the ink contained two kinds of polymers, but the styrene-acrylic acid block copolymer (polymer A) having an ethylene oxide group used as a component for the pigment dispersion solution mainly adsorbed to the pigment.

It should be noted that Block Copolymer 1 in Pigment Dispersion Solution 1 used in Example 1 was synthesized by a living radical polymerization method as described below. First, methanol was sufficiently deaerated so that water is removed. Then, the resultant was cooled with liquid nitrogen, and styrene and sodium were added to the resultant in the stated order. Subsequently, methoxytriethylene glycol methacrylate and acrylic acid were added to the mixture in the stated order, whereby Block Copolymer 1 was obtained.

In addition, Polymer 1 in Polymer Aqueous Solution 1 used in Example 1 was synthesized by dropping a mixed liquid of styrene, ethyl acrylate, acrylic acid, and a polymerization initiator (azobisisobutyronitrile) into toluene and performing polymerization at a reflux temperature.

Example 2

An ink was prepared in the same manner as in Example 1 except that Polymer Aqueous Solution 2 containing Polymer 2 instead of Polymer 1 in Polymer Aqueous Solution 1 used in Example 1 was used.

Polymer 2 used in this example has a ratio of "styrene/benzyl methacrylate/acrylic acid" of 0.114/0.770/0.116, an acid value of 90, a weight average molecular weight of 7,000, a polymer δh of 3.1, and a hydrophobic monomer δh of 2.8.

Example 3

An ink was prepared in the same manner as in Example 1 except that Polymer Aqueous Solution 3 containing Polymer 3 instead of Polymer 1 in Polymer Aqueous Solution 1 used in Example 1 was used.

Polymer 3 used in this example has a ratio of "styrene/ethyl acrylate/acrylic acid" of 0.279/0.528/0.193, an acid value of 150, a weight average molecular weight of 7,000, a polymer δh of 3.2, and a hydrophobic monomer δh of 2.6.

Example 4

An ink was prepared in the same manner as in Example 1 except that Pigment Dispersion Solution 2 containing Block Copolymer 2 instead of Block Copolymer 1 in Pigment Dispersion Solution 1 used in Example 1 was used.

Block Copolymer 2 used in this example has a ratio of "styrene/methoxytriethylene glycol methacrylate/acrylic acid" of 0.347/0.422/0.231, an acid value of 180, and a weight average molecular weight of 4,000. In addition, the EO group ratio in Block Copolymer 2 is 24 mass %.

Example 5

An ink was prepared in the same manner as in Example 1 except that Pigment Dispersion Solution 3 containing Block Copolymer 3 instead of Block Copolymer 1 in Pigment Dispersion Solution 1 used in Example 1 was used.

Block Copolymer 3 used in this example has a ratio of "styrene/methoxytriethylene glycol methacrylate/acrylic acid" of 0.424/0.422/0.154, an acid value of 120, and a weight average molecular weight of 4,000. In addition, the EO group ratio in Block Copolymer 3 is 24 mass %.

Example 6

An ink was prepared in the same manner as in Example 1 except that Polymer Aqueous Solution 4 containing Polymer 4 instead of Polymer 1 in Polymer Aqueous Solution 1 used in Example 1 was used.

Polymer 4 used in this example has a ratio of "styrene/n-butyl acrylate/acrylic acid" of 0.160/0.710/0.130, an acid value of 101, a weight average molecular weight of 7,000, a polymer δh of 3.2, and a hydrophobic monomer δh of 2.8. In addition, the n-BA/St mass ratio in Polymer 4 is 4.44.

Example 7

Pigment Dispersion Solution 4 containing Block Copolymer 4 instead of Block Copolymer 1 in Pigment Dispersion Solution 1 used in Example 1 was used.

Block Copolymer 4 used in this example has a ratio of "styrene/methoxytriethylene glycol methacrylate/acrylic acid" of 0.645/0.175/0.180, an acid value of 140, and a weight average molecular weight of 4,000. In addition, the EO group ratio in Block Copolymer 4 is 10 mass %.

In addition, Polymer Aqueous Solution 5 containing Polymer 5 instead of Polymer 1 in Polymer Aqueous Solution 1 used in Example 1 was used.

Polymer 5 used in this example has a ratio of "styrene/n-butyl acrylate/acrylic acid" of 0.655/0.184/0.161, an acid value of 125, a weight average molecular weight of 7,000, a polymer δh of 1.6, and a hydrophobic monomer δh of 0.8. In addition, the n-BA/St mass ratio in Polymer 5 is 0.28.

Then, an ink was prepared in the same manner as in Example 1 except that Pigment Dispersion Solution 4 and Polymer Aqueous Solution 5 obtained in the foregoing were used.

Example 8

An ink was prepared in the same manner as in Example 7 except that Pigment Dispersion Solution 5 containing Block Copolymer 5 was used instead of Pigment Dispersion Solution 4 containing Block Copolymer 4 used for the preparation of the ink of Example 7.

Block Copolymer 5 used in this example has a ratio of "styrene/methoxytriethylene glycol methacrylate/acrylic acid" of 0.120/0.700/0.180, an acid value of 140, and a weight average molecular weight of 4,000. In addition, the EO group ratio in Block Copolymer 5 is 40 mass %.

Example 9

An ink was prepared in the same manner as in Example 7 except that Pigment Dispersion Solution 6 containing Block Copolymer 6 was used instead of Pigment Dispersion Solution 4 containing Block Copolymer 4 used for the preparation of the ink of Example 7.

Block Copolymer 6 used in this example has a ratio of "styrene/methoxytriethylene glycol methacrylate/acrylic acid" of 0.680/0.140/0.180, an acid value of 140, and a weight average molecular weight of 4,000. In addition, the EO group ratio in Block Copolymer 6 is 8 mass %.

Example 10

An ink was prepared in the same manner as in Example 7 except that Pigment Dispersion Solution 7 containing Block Copolymer 7 was used instead of Pigment Dispersion Solution 4 containing Block Copolymer 4 used for the preparation of the ink of Example 7.

Block Copolymer 7 used in this example has a ratio of "styrene/methoxytriethylene glycol methacrylate/acrylic acid" of 0.032/0.788/0.180, an acid value of 140, and a weight average molecular weight of 4,000. In addition, the EO group ratio in Block Copolymer 7 is 45 mass %.

Example 11

An ink was prepared in the same manner as in Example 1 except that Polymer Aqueous Solution 5 containing Polymer 5 used in Example 7 instead of Polymer 1 in Polymer Aqueous Solution 1 used in Example 1 was used.

Example 12

An ink was prepared in the same manner as in Example 1 except that Polymer Aqueous Solution 6 containing Polymer 6 instead of Polymer 1 in Polymer Aqueous Solution 1 used in Example 1 was used.

Polymer 6 used in this example has a ratio of "styrene/n-butyl acrylate/acrylic acid" of 0.630/0.177/0.193, an acid value of 150, a weight average molecular weight of 6,000, a polymer δh of 1.7, and a hydrophobic monomer δh of 0.8. In addition, the n-BA/St mass ratio in Polymer 6 is 0.28.

Example 13

An ink was prepared in the same manner as in Example 1 except that Polymer Aqueous Solution 7 containing Polymer 7 instead of Polymer 1 in Polymer Aqueous Solution 1 used in Example 1 was used.

Polymer 7 used in this example has a ratio of "styrene/n-butyl acrylate/acrylic acid" of 0.691/0.193/0.116, an acid value of 90, a weight average molecular weight of 7,000, a polymer δh of 1.3, and a hydrophobic monomer δh of 0.8. In addition, the n-BA/St mass ratio in Polymer 7 is 0.28.

Example 14

An ink was prepared in the same manner as in Example 1 except that Polymer Aqueous Solution 8 containing Polymer 8 instead of Polymer 1 in Polymer Aqueous Solution 1 used in Example 1 was used.

Polymer 8 used in this example has a ratio of "styrene/n-butyl acrylate/acrylic acid" of 0.630/0.177/0.193, an acid value of 150, a weight average molecular weight of 9,000, a polymer δh of 1.7, and a hydrophobic monomer δh of 0.8. In addition, the n-BA/St mass ratio in Polymer 8 is 0.28.

Example 15

Pigment Dispersion Solution 1-2 obtained by dispersing carbon black as described below was obtained First, 51.0 mass % of a 20.0-mass % polymer aqueous solution obtained by neutralizing Block Copolymer 1 used in Example 1 with 1 equivalent of potassium hydroxide, 15.0 mass % of carbon black, and 34.0 mass % of water were mixed. Next, the mixture was sufficiently dispersed with a paint shaker using glass beads, whereby Pigment Dispersion Solution 1-2 (the content of the pigment was 15.0 mass % and the content of the polymer A was 10.2 mass %) was obtained.

The following components containing Pigment Dispersion Solution 1-2 obtained in the foregoing and Polymer Aqueous Solution 5 used in Example 7 were sufficiently mixed. After that, the mixture was further filtrated, whereby an ink was prepared.

| Pigment Dispersion Solution 1-2 | 16.7 mass % |
| Polymer Aqueous Solution 5 | 13.7 mass % |
| Glycerin | 5.0 mass % |
| Ethylene urea | 9.0 mass % |
| BC20 | 1.5 mass % |
| Acetylenol EH | 0.5 mass % |
| Water | 53.6 mass % |

Example 16

Pigment Dispersion Solution 1-3 obtained by dispersing carbon black as described below was obtained First, 45.0 mass % of a 20.0-mass % polymer aqueous solution obtained by neutralizing Block Copolymer 1 used in Example 1 with 1 equivalent of potassium hydroxide, 15.0 mass % of carbon black, and 40.0 mass % of water were mixed. Next, the mixture was sufficiently dispersed with a paint shaker using glass beads, whereby Pigment Dispersion Solution 1-3 (the content of the pigment was 15.0 mass % and the content of the polymer A was 9.0 mass %) was obtained.

The following components containing Pigment Dispersion Solution 1-3 obtained in the foregoing and Polymer Aqueous Solution 5 used in Example 7 were sufficiently mixed. After that, the mixture was further filtrated, whereby an ink was prepared.

| Pigment Dispersion Solution 1-3 | 16.7 mass % |
| Polymer Aqueous Solution 5 | 15.0 mass % |
| Glycerin | 5.0 mass % |
| Ethylene urea | 9.0 mass % |
| BC20 | 1.5 mass % |
| Acetylenol EH | 0.5 mass % |
| Water | 52.3 mass % |

Example 17

Pigment Dispersion Solution 1-4 obtained by dispersing carbon black as described below was obtained First, 56.1 mass % of a 20.0-mass % polymer aqueous solution obtained by neutralizing Block Copolymer 1 used in Example 1 with 1 equivalent of potassium hydroxide, 15.0 mass % of carbon black, and 28.9 mass % of water were mixed. Next, the mixture was sufficiently dispersed with a paint shaker using glass beads, whereby Pigment Dispersion Solution 1-4 (the content of the pigment was 15.0 mass % and the content of the polymer A was 11.2 mass %) was obtained.

The following components containing Pigment Dispersion Solution 1-4 obtained in the foregoing and Polymer Aqueous Solution 5 used in Example 7 were sufficiently mixed. After that, the mixture was further filtrated, whereby an ink was prepared.

Pigment Dispersion Solution 1-4 16.7 mass %

| | |
|---|---|
| Polymer Aqueous Solution 5 | 12.4 mass % |
| Glycerin | 5.0 mass % |
| Ethylene urea | 9.0 mass % |
| BC20 | 1.5 mass % |
| Acetylenol EH | 0.5 mass % |
| Water | 54.9 mass % |

Example 18

Pigment Dispersion Solution 1-5 obtained by dispersing carbon black as described below was obtained First, 59.1 mass % of a 20.0-mass % polymer aqueous solution obtained by neutralizing Block Copolymer 1 used in Example 1 with 1 equivalent of potassium hydroxide, 15.0 mass % of carbon black, and 25.9 mass % of water were mixed. Next, the mixture was sufficiently dispersed with a paint shaker using glass beads, whereby Pigment Dispersion Solution 1-5 (the content of the pigment was 15.0 mass % and the content of the polymer A was 11.8 mass %) was obtained.

The following components containing Pigment Dispersion Solution 1-5 obtained in the foregoing and Polymer Aqueous Solution 5 used in Example 7 were sufficiently mixed. After that, the mixture was further filtrated, whereby an ink was prepared.

| | |
|---|---|
| Pigment Dispersion Solution 1-5 | 16.7 mass % |
| Polymer Aqueous Solution 5 | 11.9 mass % |
| Glycerin | 5.0 mass % |
| Ethylene urea | 9.0 mass % |
| BC20 | 1.5 mass % |
| Acetylenol EH | 0.5 mass % |
| Water | 55.4 mass % |

Example 19

Pigment Dispersion Solution 1-6 obtained by dispersing carbon black as described below was obtained First, 36.0 mass % of a 20.0-mass % polymer aqueous solution obtained by neutralizing Block Copolymer 1 used in Example 1 with 1 equivalent of potassium hydroxide, 15.0 mass % of carbon black, and 49.0 mass % of water were mixed. Next, the mixture was sufficiently dispersed with a paint shaker using glass beads, whereby Pigment Dispersion Solution 1-6 (the content of the pigment was 15.0 mass % and the content of the polymer A was 7.2 mass %) was obtained.

The following components containing Pigment Dispersion Solution 1-6 obtained in the foregoing and Polymer Aqueous Solution 5 used in Example 7 were sufficiently mixed. After that, the mixture was further filtrated, whereby an ink was prepared.

| | |
|---|---|
| Pigment Dispersion Solution 1-6 | 16.7 mass % |
| Polymer Aqueous Solution 5 | 12.0 mass % |
| Glycerin | 5.0 mass % |
| Ethylene urea | 9.0 mass % |
| BC20 | 1.5 mass % |

-continued

| | |
|---|---|
| Acetylenol EH | 0.5 mass % |
| Water | 55.3 mass % |

Example 20

Pigment Dispersion Solution 1-7 obtained by dispersing carbon black as described below was obtained First, 33.0 mass % of a 20.0-mass % polymer aqueous solution obtained by neutralizing Block Copolymer 1 used in Example 1 with 1 equivalent of potassium hydroxide, 15.0 mass % of carbon black, and 52.0 mass % of water were mixed. Next, the mixture was sufficiently dispersed with a paint shaker using glass beads, whereby Pigment Dispersion Solution 1-7 (the content of the pigment was 15.0 mass % and the content of the polymer A was 6.6 mass %) was obtained.

The following components containing Pigment Dispersion Solution 1-7 obtained in the foregoing and Polymer Aqueous Solution 5 used in Example 7 were sufficiently mixed. After that, the mixture was further filtrated, whereby an ink was prepared.

| | |
|---|---|
| Pigment Dispersion Solution 1-7 | 16.7 mass % |
| Polymer Aqueous Solution 5 | 11.0 mass % |
| Glycerin | 5.0 mass % |
| Ethylene urea | 9.0 mass % |
| BC20 | 1.5 mass % |
| Acetylenol EH | 0.5 mass % |
| Water | 56.3 mass % |

Example 21

An ink was prepared in the same manner as in Example 1 except that Polymer Aqueous Solution 9 containing Polymer 9 instead of Polymer 1 in Polymer Aqueous Solution 1 used in Example 1 was used.

Polymer 9 used in this example has a ratio of "styrene/n-butyl acrylate/acrylic acid" of 0.630/0.177/0.193, an acid value of 150, a weight average molecular weight of 5,000, a polymer δh of 1.7, and a hydrophobic monomer δh of 0.8. In addition, the n-BA/St mass ratio in Polymer 9 is 0.28.

Example 22

An ink was prepared in the same manner as in Example 1 except that Polymer Aqueous Solution 10 containing Polymer 10 instead of Polymer 1 in Polymer Aqueous Solution 1 used in Example 1 was used.

Polymer 10 used in this example has a ratio of "styrene/n-butyl acrylate/acrylic acid" of 0.630/0.177/0.193, an acid value of 150, a weight average molecular weight of 10,000, a polymer δh of 1.7, and a hydrophobic monomer δh of 0.8. In addition, the n-BA/St mass ratio in Polymer 10 is 0.28.

Example 23

An ink was prepared in the same manner as in Example 1 except that Polymer Aqueous Solution 11 containing Polymer 11 instead of Polymer 1 in Polymer Aqueous Solution 1 used in Example 1 was used.

Polymer 11 used in this example has a ratio of "styrene/n-butyl acrylate/acrylic acid" of 0.763/0.076/0.161, an acid value of 125, a weight average molecular weight of 7,000, a polymer δh of 1.2, and a hydrophobic monomer δh of 0.3. In addition, the n-BA/St mass ratio in Polymer 11 is 0.10.

Example 24

An ink was prepared in the same manner as in Example 1 except that Polymer Aqueous Solution 12 containing Polymer 12 instead of Polymer 1 in Polymer Aqueous Solution 1 used in Example 1 was used.

Polymer 12 used in this example has a ratio of "styrene/n-butyl acrylate/acrylic acid" of 0.559/0.280/0.161, an acid value of 125, a weight average molecular weight of 7,000, a polymer δh of 1.9, and a hydrophobic monomer δh of 1.1. In addition, the n-BA/St mass ratio in Polymer 12 is 0.50.

Example 25

An ink was prepared in the same manner as in Example 1 except that Polymer Aqueous Solution 13 containing Polymer 13 instead of Polymer 1 in Polymer Aqueous Solution 1 used in Example 1 was used.

Polymer 13 used in this example has a ratio of "styrene/n-butyl acrylate/acrylic acid" of 0.671/0.168/0.161, an acid value of 125, a weight average molecular weight of 7,000, a polymer δh of 1.5, and a hydrophobic monomer δh of 0.7. In addition, the n-BA/St mass ratio in Polymer 13 is 0.25.

Example 26

An ink was prepared in the same manner as in Example 1 except that Polymer Aqueous Solution 14 containing Polymer 14 instead of Polymer 1 in Polymer Aqueous Solution 1 used in Example 1 was used.

Polymer 14 used in this example has a ratio of "styrene/n-butyl acrylate/acrylic acid" of 0.622/0.217/0.161, an acid value of 125, a weight average molecular weight of 7,000, a polymer δh of 1.7, and a hydrophobic monomer δh of 0.9. In addition, the n-BA/St mass ratio in Polymer 14 is 0.35.

Example 27

An ink was prepared in the same manner as in Example 1 except that Polymer Aqueous Solution 15 containing Polymer 15 instead of Polymer 1 in Polymer Aqueous Solution 1 used in Example 1 was used.

Polymer 15 used in this example has a ratio of "styrene/n-butyl acrylate/acrylic acid" of 0.777/0.062/0.161, an acid value of 125, a weight average molecular weight of 7,000, a polymer δh of 1.1, and a hydrophobic monomer δh of 0.3. In addition, the n-BA/St mass ratio in Polymer 15 is 0.08.

Example 28

An ink was prepared in the same manner as in Example 1 except that Polymer Aqueous Solution 16 containing Polymer 16 instead of Polymer 1 in Polymer Aqueous Solution 1 used in Example 1 was used.

Polymer 16 used in this example has a ratio of "styrene/n-butyl acrylate/acrylic acid" of 0.546/0.293/0.161, an acid value of 125, a weight average molecular weight of 7,000, a polymer δh of 1.9, and a hydrophobic monomer δh of 1.2. In addition, the n-BA/St mass ratio in Polymer 16 is 0.54.

Example 29

An ink was prepared in the same manner as in Example 1 except that Polymer Aqueous Solution 17 containing Polymer 17 instead of Polymer 1 in Polymer Aqueous Solution 1 used in Example 1 was used.

Polymer 17 used in this example has a ratio of "styrene/acrylic acid" of 0.825/0.175, an acid value of 136, a weight average molecular weight of 7,000, a polymer δh of 1.0, and a hydrophobic monomer δh of 0.0.

Example 30

The following components containing Pigment Dispersion Solution 1 used in Example 1 and Polymer Aqueous Solution 12 used in Example 24 were sufficiently mixed. After that, the mixture was further filtrated, whereby an ink was prepared.

| | |
|---|---|
| Pigment Dispersion Solution 1 | 8.0 mass % |
| Polymer Aqueous Solution 12 | 20.0 mass % |
| Glycerin | 5.0 mass % |
| Ethylene urea | 9.0 mass % |
| BC20 | 1.5 mass % |
| Acetylenol EH | 0.5 mass % |
| Water | 56.0 mass % |

Example 31

Pigment Dispersion Solution 1-8 obtained by dispersing carbon black as described below was obtained First, 15.0 mass % of a 20.0-mass % polymer aqueous solution obtained by neutralizing Block Copolymer 1 used in Example 1 with 1 equivalent of potassium hydroxide, 15.0 mass % of carbon black, and 70.0 mass % of water were mixed. Next, the mixture was sufficiently dispersed with a paint shaker using glass beads, whereby Pigment Dispersion Solution 1-8 (the content of the pigment was 15.0 mass % and the content of the polymer A was 3.0 mass %) was obtained.

The following components containing Pigment Dispersion Solution 1-8 obtained in the foregoing and Polymer Aqueous Solution 12 used in Example 24 were sufficiently mixed. After that, the mixture was further filtrated, whereby an ink was prepared.

| | |
|---|---|
| Pigment Dispersion Solution 1-8 | 8.0 mass % |
| Polymer Aqueous Solution 12 | 20.0 mass % |
| Glycerin | 5.0 mass % |
| Ethylene urea | 9.0 mass % |
| BC20 | 1.5 mass % |
| Acetylenol EH | 0.5 mass % |
| Water | 56.0 mass % |

Example 32

Pigment Dispersion Solution 1-9 obtained by dispersing carbon black as described below was obtained. First, 50.0 mass % of a 20.0-mass % polymer aqueous solution obtained by neutralizing Block Copolymer 1 used in Example 1 with 1 equivalent of potassium hydroxide, 5.0 mass % of carbon black, and 45.0 mass % of water were mixed. Next, the mixture was sufficiently dispersed with a paint shaker using glass beads, whereby Pigment Dispersion Solution 1-9 (the content of the pigment was 5.0 mass % and the content of the polymer A was 10.0 mass %) was obtained.

The following components containing Pigment Dispersion Solution 1-9 obtained in the foregoing and Polymer Aqueous Solution 12 used in Example 24 were sufficiently mixed. After that, the mixture was further filtrated, whereby an ink was prepared.

| | |
|---|---|
| Pigment Dispersion Solution 1-9 | 24.0 mass % |
| Polymer Aqueous Solution 12 | 20.0 mass % |
| Glycerin | 5.0 mass % |
| Ethylene urea | 9.0 mass % |
| BC20 | 1.5 mass % |
| Acetylenol EH | 0.5 mass % |
| Water | 40.0 mass % |

Example 33

Pigment Dispersion Solution 1-10 obtained by dispersing carbon black as described below was obtained First, 13.8 mass % of a 20.0-mass % polymer aqueous solution obtained by neutralizing Block Copolymer 1 used in Example 1 with 1 equivalent of potassium hydroxide, 15.0 mass % of carbon black, and 71.2 mass % of water were mixed. Next, the mixture was sufficiently dispersed with a paint shaker using glass beads, whereby Pigment Dispersion Solution 1-10 (the content of the pigment was 15.0 mass % and the content of the polymer A was 2.8 mass %) was obtained.

The following components containing Pigment Dispersion Solution 1-10 obtained in the foregoing and Polymer Aqueous Solution 12 used in Example 24 were sufficiently mixed. After that, the mixture was further filtrated, whereby an ink was prepared.

| | |
|---|---|
| Pigment Dispersion Solution 1-10 | 8.0 mass % |
| Polymer Aqueous Solution 12 | 20.0 mass % |
| Glycerin | 5.0 mass % |
| Ethylene urea | 9.0 mass % |
| BC20 | 1.5 mass % |
| Acetylenol EH | 0.5 mass % |
| Water | 56.0 mass % |

Example 34

Pigment Dispersion Solution 1-11 obtained by dispersing carbon black as described below was obtained First, 54.2 mass % of a 20.0-mass % polymer aqueous solution obtained by neutralizing Block Copolymer 1 used in Example 1 with 1 equivalent of potassium hydroxide, 5.0 mass % of carbon black, and 40.8 mass % of water were mixed. Next, the mixture was sufficiently dispersed with a paint shaker using glass beads, whereby Pigment Dispersion Solution 1-11 (the content of the pigment was 5.0 mass % and the content of the polymer A was 10.8 mass %) was obtained.

The following components containing Pigment Dispersion Solution 1-11 obtained in the foregoing and Polymer Aqueous Solution 12 used in Example 24 were sufficiently mixed. After that, the mixture was further filtrated, whereby an ink was prepared.

| | |
|---|---|
| Pigment Dispersion Solution 1-11 | 24.0 mass % |
| Polymer Aqueous Solution 12 | 20.0 mass % |
| Glycerin | 5.0 mass % |
| Ethylene urea | 9.0 mass % |
| BC20 | 1.5 mass % |
| Acetylenol EH | 0.5 mass % |
| Water | 40.0 mass % |

Example 35

An ink was prepared in the same manner as in Example 30 except that: the content of Polymer Aqueous Solution 12 used in Example 24 was changed from 20.0 mass % to 26.7 mass %; and the content of water was changed from 56.0 mass % to 49.3 mass %.

Example 36

An ink was prepared in the same manner as in Example 30 except that: the content of Polymer Aqueous Solution 12 used in Example 24 was changed from 20.0 mass % to 33.3 mass %; and the content of water was changed from 56.0 mass % to 42.7 mass %.

Example 37

An ink was prepared in the same manner as in Example 30 except that: the content of Polymer Aqueous Solution 12 used in Example 24 was changed from 20.0 mass % to 19.3 mass %; and the content of water was changed from 56.0 mass % to 56.7 mass %.

Example 38

An ink was prepared in the same manner as in Example 30 except that: the content of Polymer Aqueous Solution 12 used in Example 24 was changed from 20.0 mass % to 40.0 mass %; and the content of water was changed from 56.0 mass % to 36.0 mass %.

Example 39

An ink was prepared in the same manner as in Example 31 except that: the content of Polymer Aqueous Solution 12 used in Example 24 was changed from 20.0 mass % to 32.0 mass %; and the content of water was changed from 56.0 mass % to 44.0 mass %.

Example 40

An ink was prepared in the same manner as in Example 31 except that: the content of Polymer Aqueous Solution 12 used in Example 24 was changed from 20.0 mass % to 33.3 mass %; and the content of water was changed from 56.0 mass % to 42.7 mass %.

Example 41

Pigment Dispersion Solution 8 obtained by dispersing carbon black as described below was obtained First, 37.5 mass % of a 20.0-mass % polymer aqueous solution obtained by neutralizing Block Copolymer 8 used in Example 1 with 1 equivalent of potassium hydroxide, 15.0 mass % of carbon black, and 47.5 mass % of water were mixed. Next, the mixture was sufficiently dispersed with a paint shaker using glass beads, whereby Pigment Dispersion Solution 8 (the content of the pigment was 15.0 mass % and the content of the polymer A was 7.5 mass %) was obtained.

Block Copolymer 8 used in this example has a ratio of "styrene/methoxytriethylene glycol methacrylate/acrylic acid" of 0.398/0.422/0.180, an acid value of 140, and a weight average molecular weight of 3,000. In addition, the EO group ratio in Block Copolymer 8 is 24 mass %.

The following components containing Pigment Dispersion Solution 8 obtained in the foregoing and Polymer Aqueous Solution 5 used in Example 7 were sufficiently mixed. After that, the mixture was further filtrated, whereby an ink was prepared.

| | |
|---|---|
| Pigment Dispersion Solution 8 | 16.7 mass % |
| Polymer Aqueous Solution 5 | 16.7 mass % |
| Glycerin | 5.0 mass % |
| Ethylene urea | 9.0 mass % |
| BC20 | 1.5 mass % |
| Acetylenol EH | 0.5 mass % |
| Water | 50.6 mass % |

Example 42

An ink was prepared in the same manner as in Example 41 except that Pigment Dispersion Solution 9 containing Block Copolymer 9 instead of Block Copolymer 8 in Pigment Dispersion Solution 8 used in Example 41 was used.

Block Copolymer 9 used in this example has a ratio of "styrene/methoxytriethylene glycol methacrylate/acrylic acid" of 0.398/0.422/0.180, an acid value of 140, and a weight average molecular weight of 6,000. In addition, the EO group ratio in Block Copolymer 9 is 24 mass %.

Example 43

An ink was prepared in the same manner as in Example 41 except that Pigment Dispersion Solution 10 containing Block Copolymer 10 instead of Block Copolymer 8 in Pigment Dispersion Solution 8 used in Example 41 was used.

Block Copolymer 10 used in this example has a ratio of "styrene/methoxytriethylene glycol methacrylate/acrylic acid" of 0.398/0.422/0.180, an acid value of 140, and a weight average molecular weight of 2,000. In addition, the EO group ratio in Block Copolymer 10 is 24 mass %.

Example 44

An ink was prepared in the same manner as in Example 41 except that Pigment Dispersion Solution 11 containing Block Copolymer 11 instead of Block Copolymer 8 in Pigment Dispersion Solution 8 used in Example 41 was used.

Block Copolymer 11 used in this example has a ratio of "styrene/methoxytriethylene glycol methacrylate/acrylic acid" of 0.398/0.422/0.180, an acid value of 140, and a weight average molecular weight of 7,000. In addition, the EO group ratio in Block Copolymer 11 is 24 mass %.

Example 45

An ink was prepared in the same manner as in Example 44 except that Polymer Aqueous Solution 18 containing Polymer 18 instead of Polymer 5 in Polymer Aqueous Solution 5 used in Example 44 was used.

Polymer 18 used in this example has a ratio of "styrene/n-butyl acrylate/acrylic acid" of 0.655/0.184/0.161, an acid value of 125, a weight average molecular weight of 6,000, a polymer δh of 1.6, and a hydrophobic monomer δh of 0.8. In addition, the n-BA/St mass ratio in Polymer 18 is 0.28.

Example 46

An ink was prepared in the same manner as in Example 1 except that Polymer Aqueous Solution 19 containing Polymer 19 instead of Polymer 1 in Polymer Aqueous Solution 1 used in Example 1 was used.

Polymer 19 used in this example has a ratio of "styrene/n-butyl acrylate/acrylic acid" of 0.687/0.200/0.113, an acid value of 88, a weight average molecular weight of 7,000, a polymer δh of 1.3, and a hydrophobic monomer δh of 0.8. In addition, the n-BA/St mass ratio in Polymer 19 is 0.29.

Comparative Example 1

An ink was prepared in the same manner as in Example 1 except that Polymer Aqueous Solution 20 containing Polymer 20 instead of Polymer 1 in Polymer Aqueous Solution 1 used in Example 1 was used.

Polymer 20 used in this example has a ratio "styrene/benzyl methacrylate/acrylic acid" of 0.220/0.640/0.140, an acid value of 109, a weight average molecular weight of 7,000, a polymer δh of 3.3, and a hydrophobic monomer δh of 2.9.

Comparative Example 2

An ink was prepared in the same manner as in Example 1 except that Pigment Dispersion Solution 12 containing Block Copolymer 12 instead of Block Copolymer 1 in Pigment Dispersion Solution 1 used in Example 1 was used.

Block Copolymer 12 used in this example has a ratio of "styrene/methoxytriethylene glycol methacrylate/acrylic acid" of 0.430/0.422/0.148, an acid value of 115, and a weight average molecular weight of 4,000. In addition, the EO group ratio in Block Copolymer 12 is 24 mass %.

Comparative Example 3

An ink was prepared in the same manner as in Example 1 except that Pigment Dispersion Solution 13 containing Block Copolymer 13 instead of Block Copolymer 1 in Pigment Dispersion Solution 1 used in Example 1 was used.

Block Copolymer 13 used in this example has a ratio of "styrene/methoxytriethylene glycol methacrylate/acrylic acid" of 0.340/0.422/0.238, an acid value of 185, and a weight average molecular weight of 4,000. In addition, the EO group ratio in Block Copolymer 13 is 24 mass %.

Comparative Example 4

An ink was prepared in the same manner as in Example 1 except that Polymer Aqueous Solution 21 containing Polymer 21 instead of Polymer 1 in Polymer Aqueous Solution 1 used in Example 1 was used.

Polymer 21 used in this example has a ratio of "styrene/ethyl acrylate/acrylic acid" of 0.834/0.050/0.116, an acid value of 90, a weight average molecular weight of 7,000, a polymer δh of 0.9, and a hydrophobic monomer δh of 0.2.

Comparative Example 5

Pigment Dispersion Solution 14 obtained by dispersing carbon black as described below was obtained First, 37.5 mass % of a 20.0-mass % polymer aqueous solution obtained by neutralizing Block Copolymer 1 used in Example 1 with 1 equivalent of potassium hydroxide, 15.0 mass % of carbon black, and 47.5 mass % of water were mixed. Next, the mixture was sufficiently dispersed with a paint shaker using glass beads, whereby Pigment Dispersion Solution 14 (the content of the pigment was 15.0 mass % and the content of the polymer was 7.5 mass %) was obtained.

In addition, Polymer Aqueous Solution 1-2 was obtained as described below. 20.0 mass % of Polymer 1 used in Example 1, 1 equivalent of potassium hydroxide with respect to a carboxylic acid in Polymer 1 were added to water so that the mixture totals 100.0 mass %. Then, the resultant was stirred at 80° C., whereby Polymer 1 was dissolved. After that, water was added to adjust the content of a solid (Polymer B) to 20.0 mass %, whereby Polymer Aqueous Solution 1-2 was obtained.

The following components containing Pigment Dispersion Solution 14 obtained in the foregoing and Polymer Aqueous Solution 1-2 obtained in the foregoing were sufficiently mixed. After that, the mixture was further filtrated, whereby an ink was prepared.

| | |
|---|---|
| Pigment Dispersion Solution 14 | 16.7 mass % |
| Polymer Aqueous Solution 1-2 | 12.5 mass % |
| Glycerin | 5.0 mass % |
| Ethylene urea | 9.0 mass % |
| BC20 | 1.5 mass % |
| Acetylenol EH | 0.5 mass % |
| Water | 54.8 mass % |

Comparative Example 6

In addition, Polymer Aqueous Solution 22 was obtained as described below. 20.0 mass % of Block Copolymer 1 used in Example 1, 1 equivalent of potassium hydroxide with respect to a carboxylic acid in Block Copolymer 1 were added water so that the mixture totals 100.0 mass %. Then, the resultant was stirred at 80° C., whereby Block Copolymer 1 was dissolved. After that, water was added to adjust the content of a solid (Polymer) to 20.0 mass %, whereby Polymer Aqueous Solution 22 was obtained.

The following components containing Pigment Dispersion Solution 1 used in Example 1 and Polymer Aqueous Solution 22 were sufficiently mixed. After that, the mixture was further filtrated, whereby an ink was prepared.

| | |
|---|---|
| Pigment Dispersion Solution 1 | 16.7 mass % |
| Polymer Aqueous Solution 22 | 12.5 mass % |
| Glycerin | 5.0 mass % |
| Ethylene urea | 9.0 mass % |
| BC20 | 1.5 mass % |
| Acetylenol EH | 0.5 mass % |
| Water | 54.8 mass % |

Reference Example 1

An ink was prepared in the same manner as in Example 1 except that Polymer Aqueous Solution 23 containing Polymer 23 instead of Polymer 1 in Polymer Aqueous Solution 1 used in Example 1 was used.

Polymer 23 used in this example has a ratio of "styrene/benzyl methacrylate/acrylic acid" of 0.166/0.635/0.199, an acid value of 155, a weight average molecular weight of 7,000, a polymer δh of 3.2, and a hydrophobic monomer δh of 2.5.

Reference Example 2

An ink was prepared in the same manner as in Example 1 except that Polymer Aqueous Solution 24 containing Polymer 24 instead of Polymer 1 in Polymer Aqueous Solution 1 used in Example 1 was used.

Polymer 24 used in this example has a ratio of "styrene/ethyl acrylate/acrylic acid" of 0.235/0.652/0.113, an acid value of 88, a weight average molecular weight of 7,000, a polymer δh of 3.2, and a hydrophobic monomer δh of 2.9.

(Hydrogen Bond Parameter (δh) of Polymer Obtained by Solubility Parameters of Monomers Constituting the Polymer)

The hydrogen bond parameter (δh) of a polymer obtained by the solubility parameters of monomers constituting the polymer was determined as described below. First, the hydrogen bond parameter (δh) of each of the monomers constituting the polymer is obtained by the solubility parameter inherent in each of the monomers constituting the polymer. Then, the value obtained by multiplying the hydrogen bond parameter (δh) of each of the monomers constituting the polymer by the composition (mass) ratio of the monomer constituting the polymer (the sum of the composition ratios equals 1) is determined. Next, those values are summed, whereby the hydrogen bond parameter of the polymer obtained by the solubility parameters of the monomers constituting the polymer can be determined. Table 1 shows the value of the hydrogen bond parameter (δh) of a monomer constituting each of the polymers used for the preparation of the above pigment dispersion solutions obtained by the solubility parameter inherent in the monomer.

A method of determining the hydrogen bond parameter of a polymer obtained by the solubility parameter of a monomer constituting the polymer obtained by using the value shown in Table 1 will be specifically described below. Here, description will be given by taking Polymer 1 used in Example 1 which is a copolymer of styrene, ethyl acrylate, and acrylic acid (composition (mass) ratio "styrene:ethyl acrylate:acrylic acid"=0.234:0.650:0.116) as an example. Table 1 below shows that the hydrogen bond parameters of styrene, ethyl acrylate, and acrylic acid, which are monomers constituting Polymer 1, obtained by the solubility parameters (represented in "$cal^{0.5}/cm^{1.5}$" units) are 0.00, 3.90, and 5.81, respectively. Therefore, the hydrogen bond parameter (δh) of Polymer 1 obtained by the solubility parameters of the monomers constituting Polymer 1 is determined from the monomer composition of the polymer as shown in the following equation.

Hydrogen bond parameter (δh) of Polymer 1 obtained by solubility parameters of monomers constituting Polymer $1 = 0.00 \times 0.234 + 3.90 \times 0.650 + 5.81 \times 0.116 = 3.2$ ($cal^{0.5}/cm^{1.5}$)

TABLE 1

Hydrogen bond parameter of each monomer

| Monomer | | Whether the monomer corresponds to a hydrophobic monomer | Hydrogen bond parameter of monomer(δh) ($cal^{0.5}/cm^{1.5}$) (*1) |
|---|---|---|---|
| Kind | Abbreviation symbol | | |
| Styrene | St | yes | 0.00 |
| Benzyl methacrylate | BZMA | yes | 3.21 |
| n-butyl acrylate | n-BA | yes | 3.44 |
| Ethyl acrylate | EA | yes | 3.90 |
| Methyl methacrylate | MMA | no | 3.93 |
| Methacrylate | MA | no | 5.30 |
| Acrylic acid | AA | no | 5.81 |

(*1) Hydrogen bond parameter (δh) obtained by solubility parameter inherent in each monomer (Summary of Physical Properties of Polymers Used in Respective Inks and Properties of the Respective Inks)

Tables 2 to 11 show values for, for example, the physical properties of the polymer A and the polymer B used in the examples, the comparative examples, and the reference examples, and the contents of the pigments, the polymer A, and the polymer B in the inks.

TABLE 2

Composition of polymer A used in pigment dispersion solution

| | | Polymer A | | | | | | |
|---|---|---|---|---|---|---|---|---|
| | Block co-polymer No. | Monomer 1 | | Monomer 2 | | Monomer 3 | | |
| Example | 1 | 1 | St | 0.398 | OMe(EG)$_3$MA | 0.422 | AA | 0.180 |
| | 2 | 1 | St | 0.398 | OMe(EG)$_3$MA | 0.422 | AA | 0.180 |
| | 3 | 1 | St | 0.398 | OMe(EG)$_3$MA | 0.422 | AA | 0.180 |
| | 4 | 2 | St | 0.347 | OMe(EG)$_3$MA | 0.422 | AA | 0.231 |
| | 5 | 3 | St | 0.424 | OMe(EG)$_3$MA | 0.422 | AA | 0.154 |
| | 6 | 1 | St | 0.398 | OMe(EG)$_3$MA | 0.422 | AA | 0.180 |
| | 7 | 4 | St | 0.645 | OMe(EG)$_3$MA | 0.175 | AA | 0.180 |
| | 8 | 5 | St | 0.120 | OMe(EG)$_3$MA | 0.700 | AA | 0.180 |
| | 9 | 6 | St | 0.680 | OMe(EG)$_3$MA | 0.140 | AA | 0.180 |
| | 10 | 7 | St | 0.032 | OMe(EG)$_3$MA | 0.788 | AA | 0.180 |
| | 11 | 1 | St | 0.398 | OMe(EG)$_3$MA | 0.422 | AA | 0.180 |
| | 12 | 1 | St | 0.398 | OMe(EG)$_3$MA | 0.422 | AA | 0.180 |
| | 13 | 1 | St | 0.398 | OMe(EG)$_3$MA | 0.422 | AA | 0.180 |
| | 14 | 1 | St | 0.398 | OMe(EG)$_3$MA | 0.422 | AA | 0.180 |
| | 15 | 1 | St | 0.398 | OMe(EG)$_3$MA | 0.422 | AA | 0.180 |
| | 16 | 1 | St | 0.398 | OMe(EG)$_3$MA | 0.422 | AA | 0.180 |
| | 17 | 1 | St | 0.398 | OMe(EG)$_3$MA | 0.422 | AA | 0.180 |
| | 18 | 1 | St | 0.398 | OMe(EG)$_3$MA | 0.422 | AA | 0.180 |
| | 19 | 1 | St | 0.398 | OMe(EG)$_3$MA | 0.422 | AA | 0.180 |
| | 20 | 1 | St | 0.398 | OMe(EG)$_3$MA | 0.422 | AA | 0.180 |
| | 21 | 1 | St | 0.398 | OMe(EG)$_3$MA | 0.422 | AA | 0.180 |
| | 22 | 1 | St | 0.398 | OMe(EG)$_3$MA | 0.422 | AA | 0.180 |
| | 23 | 1 | St | 0.398 | OMe(EG)$_3$MA | 0.422 | AA | 0.180 |
| | 24 | 1 | St | 0.398 | OMe(EG)$_3$MA | 0.422 | AA | 0.180 |
| | 25 | 1 | St | 0.398 | OMe(EG)$_3$MA | 0.422 | AA | 0.180 |
| | 26 | 1 | St | 0.398 | OMe(EG)$_3$MA | 0.422 | AA | 0.180 |
| | 27 | 1 | St | 0.398 | OMe(EG)$_3$MA | 0.422 | AA | 0.180 |

OMe(EG)$_3$MA: Methoxytriethylene glycol methacrylate

TABLE 3

Main composition of pigment dispersion solution and main properties of polymer A used

| | | Polymer A | | | | Pigment dispersion solution | | |
|---|---|---|---|---|---|---|---|---|
| | | Block copolymer No. | Acid value (mgKOH/g) | Weight average molecular weight | EO group ratio (*1) | Pigment dispersion solution No. | Content of pigment (%) | Content of polymer A (%) | Polymer A/pigment (*2) |
| Example | 1 | 1 | 140 | 4,000 | 24 | 1 | 15.0 | 7.5 | 0.50 |
| | 2 | 1 | 140 | 4,000 | 24 | 1 | 15.0 | 7.5 | 0.50 |
| | 3 | 1 | 140 | 4,000 | 24 | 1 | 15.0 | 7.5 | 0.50 |
| | 4 | 2 | 180 | 4,000 | 24 | 2 | 15.0 | 7.5 | 0.50 |
| | 5 | 3 | 120 | 4,000 | 24 | 3 | 15.0 | 7.5 | 0.50 |
| | 6 | 1 | 140 | 4,000 | 24 | 1 | 15.0 | 7.5 | 0.50 |
| | 7 | 4 | 140 | 4,000 | 10 | 4 | 15.0 | 7.5 | 0.50 |
| | 8 | 5 | 140 | 4,000 | 40 | 5 | 15.0 | 7.5 | 0.50 |
| | 9 | 6 | 140 | 4,000 | 8 | 6 | 15.0 | 7.5 | 0.50 |
| | 10 | 7 | 140 | 4,000 | 45 | 7 | 15.0 | 7.5 | 0.50 |
| | 11 | 1 | 140 | 4,000 | 24 | 1 | 15.0 | 7.5 | 0.50 |
| | 12 | 1 | 140 | 4,000 | 24 | 1 | 15.0 | 7.5 | 0.50 |
| | 13 | 1 | 140 | 4,000 | 24 | 1 | 15.0 | 7.5 | 0.50 |
| | 14 | 1 | 140 | 4,000 | 24 | 1 | 15.0 | 7.5 | 0.50 |
| | 15 | 1 | 140 | 4,000 | 24 | 1-2 | 15.0 | 10.2 | 0.68 |
| | 16 | 1 | 140 | 4,000 | 24 | 1-3 | 15.0 | 9.0 | 0.60 |
| | 17 | 1 | 140 | 4,000 | 24 | 1-4 | 15.0 | 11.2 | 0.75 |
| | 18 | 1 | 140 | 4,000 | 24 | 1-5 | 15.0 | 11.8 | 0.79 |
| | 19 | 1 | 140 | 4,000 | 24 | 1-6 | 15.0 | 7.2 | 0.48 |
| | 20 | 1 | 140 | 4,000 | 24 | 1-7 | 15.0 | 6.6 | 0.44 |
| | 21 | 1 | 140 | 4,000 | 24 | 1 | 15.0 | 7.5 | 0.50 |
| | 22 | 1 | 140 | 4,000 | 24 | 1 | 15.0 | 7.5 | 0.50 |
| | 23 | 1 | 140 | 4,000 | 24 | 1 | 15.0 | 7.5 | 0.50 |
| | 24 | 1 | 140 | 4,000 | 24 | 1 | 15.0 | 7.5 | 0.50 |
| | 25 | 1 | 140 | 4,000 | 24 | 1 | 15.0 | 7.5 | 0.50 |
| | 26 | 1 | 140 | 4,000 | 24 | 1 | 15.0 | 7.5 | 0.50 |
| | 27 | 1 | 140 | 4,000 | 24 | 1 | 15.0 | 7.5 | 0.50 |

(*1) Ratio of ethylene oxide group constituting polymer A with respect to the total mass of polymer A
(*2) Ratio of content of polymer A to content of the pigment

TABLE 4

Composition of polymer A used in pigment dispersion solution

| | | Polymer A | | | | | | |
|---|---|---|---|---|---|---|---|---|
| | | Block copolymer No. | Monomer 1 | | Monomer 2 | | Monomer 3 | |
| Example | 28 | 1 | St | 0.398 | OMe(EG)₃MA | 0.422 | AA | 0.180 |
| | 29 | 1 | St | 0.398 | OMe(EG)₃MA | 0.422 | AA | 0.180 |
| | 30 | 1 | St | 0.398 | OMe(EG)₃MA | 0.422 | AA | 0.180 |
| | 31 | 1 | St | 0.398 | OMe(EG)₃MA | 0.422 | AA | 0.180 |
| | 32 | 1 | St | 0.398 | OMe(EG)₃MA | 0.422 | AA | 0.180 |
| | 33 | 1 | St | 0.398 | OMe(EG)₃MA | 0.422 | AA | 0.180 |
| | 34 | 1 | St | 0.398 | OMe(EG)₃MA | 0.422 | AA | 0.180 |
| | 35 | 1 | St | 0.398 | OMe(EG)₃MA | 0.422 | AA | 0.180 |
| | 36 | 1 | St | 0.398 | OMe(EG)₃MA | 0.422 | AA | 0.180 |
| | 37 | 1 | St | 0.398 | OMe(EG)₃MA | 0.422 | AA | 0.180 |
| | 38 | 1 | St | 0.398 | OMe(EG)₃MA | 0.422 | AA | 0.180 |
| | 39 | 1 | St | 0.398 | OMe(EG)₃MA | 0.422 | AA | 0.180 |
| | 40 | 1 | St | 0.398 | OMe(EG)₃MA | 0.422 | AA | 0.180 |
| | 41 | 8 | St | 0.398 | OMe(EG)₃MA | 0.422 | AA | 0.180 |
| | 42 | 9 | St | 0.398 | OMe(EG)₃MA | 0.422 | AA | 0.180 |
| | 43 | 10 | St | 0.398 | OMe(EG)₃MA | 0.422 | AA | 0.180 |
| | 44 | 11 | St | 0.398 | OMe(EG)₃MA | 0.422 | AA | 0.180 |
| | 45 | 11 | St | 0.398 | OMe(EG)₃MA | 0.422 | AA | 0.180 |
| | 46 | 1 | St | 0.398 | OMe(EG)₃MA | 0.422 | AA | 0.180 |
| Comparative Example | 1 | 1 | St | 0.398 | OMe(EG)₃MA | 0.422 | AA | 0.180 |
| | 2 | 12 | St | 0.430 | OMe(EG)₃MA | 0.422 | AA | 0.148 |
| | 3 | 13 | St | 0.340 | OMe(EG)₃MA | 0.422 | AA | 0.238 |
| | 4 | 1 | St | 0.398 | OMe(EG)₃MA | 0.422 | AA | 0.180 |
| | 5 | | Only Polymer 1 is used in the ink. | | | | | |
| | 6 | 1 | Only Block Copolymer 1 is used in the ink. | | | | | |
| Reference Example | 1 | 1 | St | 0.398 | OMe(EG)₃MA | 0.422 | AA | 0.180 |
| | 2 | 1 | St | 0.398 | OMe(EG)₃MA | 0.422 | AA | 0.180 |

OMe(EG)₃MA: Methoxytriethylene glycol methacrylate

TABLE 5

Main composition of pigment dispersion solution and main properties of polymer A used

| | | Polymer A | | | | Pigment dispersion solution | | | |
|---|---|---|---|---|---|---|---|---|---|
| | | Block copolymer No. | Acid value (mgKOH/g) | Weight average molecular weight | EO group ratio (*1) | Pigment dispersion solution No. | Content of pigment (%) | Content of polymer A (%) | Polymer A/pigment (*2) |
| Example | 28 | 1 | 140 | 4,000 | 24 | 1 | 15.0 | 7.5 | 0.50 |
| | 29 | 1 | 140 | 4,000 | 24 | 1 | 15.0 | 7.5 | 0.50 |
| | 30 | 1 | 140 | 4,000 | 24 | 1 | 15.0 | 7.5 | 0.50 |
| | 31 | 1 | 140 | 4,000 | 24 | 1-8 | 15.0 | 3.0 | 0.20 |
| | 32 | 1 | 140 | 4,000 | 24 | 1-9 | 5.0 | 10.0 | 2.00 |
| | 33 | 1 | 140 | 4,000 | 24 | 1-10 | 15.0 | 2.8 | 0.19 |
| | 34 | 1 | 140 | 4,000 | 24 | 1-11 | 5.0 | 10.8 | 2.16 |
| | 35 | 1 | 140 | 4,000 | 24 | 1 | 15.0 | 7.5 | 0.50 |
| | 36 | 1 | 140 | 4,000 | 24 | 1 | 15.0 | 7.5 | 0.50 |
| | 37 | 1 | 140 | 4,000 | 24 | 1 | 15.0 | 7.5 | 0.50 |
| | 38 | 1 | 140 | 4,000 | 24 | 1 | 15.0 | 7.5 | 0.50 |
| | 39 | 1 | 140 | 4,000 | 24 | 1-8 | 15.0 | 3.0 | 0.20 |
| | 40 | 1 | 140 | 4,000 | 24 | 1-8 | 15.0 | 3.0 | 0.20 |
| | 41 | 8 | 140 | 3,000 | 24 | 8 | 15.0 | 7.5 | 0.50 |
| | 42 | 9 | 140 | 6,000 | 24 | 9 | 15.0 | 7.5 | 0.50 |
| | 43 | 10 | 140 | 2,000 | 24 | 10 | 15.0 | 7.5 | 0.50 |
| | 44 | 11 | 140 | 7,000 | 24 | 11 | 15.0 | 7.5 | 0.50 |
| | 45 | 11 | 140 | 7,000 | 24 | 11 | 15.0 | 7.5 | 0.50 |
| | 46 | 1 | 140 | 4,000 | 24 | 1 | 15.0 | 7.5 | 0.50 |
| Comparative Example | 1 | 1 | 140 | 4,000 | 24 | 1 | 15.0 | 7.5 | 0.50 |
| | 2 | 12 | 115 | 4,000 | 24 | 12 | 15.0 | 7.5 | 0.50 |
| | 3 | 13 | 185 | 4,000 | 24 | 13 | 15.0 | 7.5 | 0.50 |
| | 4 | 1 | 140 | 4,000 | 24 | 1 | 15.0 | 7.5 | 0.50 |
| | 5 | | Only Polymer 1 is used in the ink. | | | 14 | 15.0 | 7.5 | — |
| | 6 | 1 | (*3) | | | 1 | 15.0 | 7.5 | — |
| Reference Example | 1 | 1 | 140 | 4,000 | 24 | 1 | 15.0 | 7.5 | 0.50 |
| | 2 | 1 | 140 | 4,000 | 24 | 1 | 15.0 | 7.5 | 0.50 |

(*1) Ratio of ethylene oxide group constituting polymer A with respect to the total mass of polymer A
(*2) Ratio of content of polymer A to content of the pigment
(*3) Only Block Copolymer 1 is used in the ink.

TABLE 6

Main composition of polymer B used in polymer aqueous solution

| | | Polymer B | | | | | | |
|---|---|---|---|---|---|---|---|---|
| | Polymer No. | Monomer 1 | | Monomer 2 | | Monomer 3 | | |
| Example | 1 | 1 | St | 0.234 | EA | 0.650 | AA | 0.116 |
| | 2 | 2 | St | 0.114 | BZMA | 0.770 | AA | 0.116 |
| | 3 | 3 | St | 0.279 | EA | 0.528 | AA | 0.193 |
| | 4 | 1 | St | 0.234 | EA | 0.650 | AA | 0.116 |
| | 5 | 1 | St | 0.234 | EA | 0.650 | AA | 0.116 |
| | 6 | 4 | St | 0.160 | n-BA | 0.710 | AA | 0.130 |
| | 7 | 5 | St | 0.655 | n-BA | 0.184 | AA | 0.161 |
| | 8 | 5 | St | 0.655 | n-BA | 0.184 | AA | 0.161 |
| | 9 | 5 | St | 0.655 | n-BA | 0.184 | AA | 0.161 |
| | 10 | 5 | St | 0.655 | n-BA | 0.184 | AA | 0.161 |
| | 11 | 5 | St | 0.655 | n-BA | 0.184 | AA | 0.161 |
| | 12 | 6 | St | 0.630 | n-BA | 0.177 | AA | 0.193 |
| | 13 | 7 | St | 0.691 | n-BA | 0.193 | AA | 0.116 |
| | 14 | 8 | St | 0.630 | n-BA | 0.177 | AA | 0.193 |
| | 15 | 5 | St | 0.655 | n-BA | 0.184 | AA | 0.161 |
| | 16 | 5 | St | 0.655 | n-BA | 0.184 | AA | 0.161 |
| | 17 | 5 | St | 0.655 | n-BA | 0.184 | AA | 0.161 |
| | 18 | 5 | St | 0.655 | n-BA | 0.184 | AA | 0.161 |
| | 19 | 5 | St | 0.655 | n-BA | 0.184 | AA | 0.161 |
| | 20 | 5 | St | 0.655 | n-BA | 0.184 | AA | 0.161 |
| | 21 | 9 | St | 0.630 | n-BA | 0.177 | AA | 0.193 |
| | 22 | 10 | St | 0.630 | n-BA | 0.177 | AA | 0.193 |
| | 23 | 11 | St | 0.763 | n-BA | 0.076 | AA | 0.161 |
| | 24 | 12 | St | 0.559 | n-BA | 0.280 | AA | 0.161 |
| | 25 | 13 | St | 0.671 | n-BA | 0.168 | AA | 0.161 |
| | 26 | 14 | St | 0.622 | n-BA | 0.217 | AA | 0.161 |
| | 27 | 15 | St | 0.777 | n-BA | 0.062 | AA | 0.161 |

TABLE 7

Main composition of polymer aqueous solution and main properties of polymer B used

| | | Polymer B | | | | | Polymer aqueous solution | |
|---|---|---|---|---|---|---|---|---|
| | | Polymer No. | Acid value (mgKOH/g) | Weight average molecular weight | Hydrogen bond parameter of polymer ($\delta h$) (*1) | Hydrogen bond parameter of hydrophobic monomer ($\delta h$ *2) | n-BA/St mass ratio (*3) | Polymer aqueous solution No. | Content of polymer B (%) |
| Example | 1 | 1 | 90 | 7,000 | 3.2 | 2.9 | — | 1 | 15.0 |
| | 2 | 2 | 90 | 7,000 | 3.1 | 2.8 | — | 2 | 15.0 |
| | 3 | 3 | 150 | 7,000 | 3.2 | 2.6 | — | 3 | 15.0 |
| | 4 | 1 | 90 | 7,000 | 3.2 | 2.9 | — | 1 | 15.0 |
| | 5 | 1 | 90 | 7,000 | 3.2 | 2.9 | — | 1 | 15.0 |
| | 6 | 4 | 101 | 7,000 | 3.2 | 2.8 | 4.44 | 4 | 15.0 |
| | 7 | 5 | 125 | 7,000 | 1.6 | 0.8 | 0.28 | 5 | 15.0 |
| | 8 | 5 | 125 | 7,000 | 1.6 | 0.8 | 0.28 | 5 | 15.0 |
| | 9 | 5 | 125 | 7,000 | 1.6 | 0.8 | 0.28 | 5 | 15.0 |
| | 10 | 5 | 125 | 7,000 | 1.6 | 0.8 | 0.28 | 5 | 15.0 |
| | 11 | 5 | 125 | 7,000 | 1.6 | 0.8 | 0.28 | 5 | 15.0 |
| | 12 | 6 | 150 | 6,000 | 1.7 | 0.8 | 0.28 | 6 | 15.0 |
| | 13 | 7 | 90 | 7,000 | 1.3 | 0.8 | 0.28 | 7 | 15.0 |
| | 14 | 8 | 150 | 9,000 | 1.7 | 0.8 | 0.28 | 8 | 15.0 |
| | 15 | 5 | 125 | 7,000 | 1.6 | 0.8 | 0.28 | 5 | 15.0 |
| | 16 | 5 | 125 | 7,000 | 1.6 | 0.8 | 0.28 | 5 | 15.0 |
| | 17 | 5 | 125 | 7,000 | 1.6 | 0.8 | 0.28 | 5 | 15.0 |
| | 18 | 5 | 125 | 7,000 | 1.6 | 0.8 | 0.28 | 5 | 15.0 |
| | 19 | 5 | 125 | 7,000 | 1.6 | 0.8 | 0.28 | 5 | 15.0 |
| | 20 | 5 | 125 | 7,000 | 1.6 | 0.8 | 0.28 | 5 | 15.0 |
| | 21 | 9 | 150 | 5,000 | 1.7 | 0.8 | 0.28 | 9 | 15.0 |
| | 22 | 10 | 150 | 10,000 | 1.7 | 0.8 | 0.28 | 10 | 15.0 |
| | 23 | 11 | 125 | 7,000 | 1.2 | 0.3 | 0.10 | 11 | 15.0 |
| | 24 | 12 | 125 | 7,000 | 1.9 | 1.1 | 0.50 | 12 | 15.0 |
| | 25 | 13 | 125 | 7,000 | 1.5 | 0.7 | 0.25 | 13 | 15.0 |
| | 26 | 14 | 125 | 7,000 | 1.7 | 0.9 | 0.35 | 14 | 15.0 |
| | 27 | 15 | 125 | 7,000 | 1.1 | 0.3 | 0.08 | 15 | 15.0 |

(*1) Hydrogen bond parameter ($\delta h$) of polymer obtained by solubility parameter of monomers constituting the polymer ($\delta h$) (cal$^{0.5}$/cm$^{1.5}$)
(*2) Hydrogen bond parameter ($\delta h$) of hydrophobic monomer ($\delta h$) (cal$^{0.5}$/cm$^{1.5}$)
(*3) Mass ratio of n-butyl acrylate with respect to styrene in polymer

TABLE 8

| | | Polymer No. | Monomer 1 | | Monomer 2 | | Monomer 3 | |
|---|---|---|---|---|---|---|---|---|
| Example | 28 | 16 | St | 0.546 | n-BA | 0.293 | AA | 0.161 |
| | 29 | 17 | St | 0.825 | — | — | AA | 0.175 |
| | 30 | 12 | St | 0.559 | n-BA | 0.280 | AA | 0.161 |
| | 31 | 12 | St | 0.559 | n-BA | 0.280 | AA | 0.161 |
| | 32 | 12 | St | 0.559 | n-BA | 0.280 | AA | 0.161 |
| | 33 | 12 | St | 0.559 | n-BA | 0.280 | AA | 0.161 |
| | 34 | 12 | St | 0.559 | n-BA | 0.280 | AA | 0.161 |
| | 35 | 12 | St | 0.559 | n-BA | 0.280 | AA | 0.161 |
| | 36 | 12 | St | 0.559 | n-BA | 0.280 | AA | 0.161 |
| | 37 | 12 | St | 0.559 | n-BA | 0.280 | AA | 0.161 |
| | 38 | 12 | St | 0.559 | n-BA | 0.280 | AA | 0.161 |
| | 39 | 12 | St | 0.559 | n-BA | 0.280 | AA | 0.161 |
| | 40 | 12 | St | 0.559 | n-BA | 0.280 | AA | 0.161 |
| | 41 | 5 | St | 0.655 | n-BA | 0.184 | AA | 0.161 |
| | 42 | 5 | St | 0.655 | n-BA | 0.184 | AA | 0.161 |
| | 43 | 5 | St | 0.655 | n-BA | 0.184 | AA | 0.161 |
| | 44 | 5 | St | 0.655 | n-BA | 0.184 | AA | 0.161 |
| | 45 | 18 | St | 0.655 | n-BA | 0.184 | AA | 0.161 |
| | 46 | 19 | St | 0.687 | n-BA | 0.200 | AA | 0.113 |
| Comparative Example | 1 | 20 | St | 0.220 | EA | 0.640 | AA | 0.140 |
| | 2 | 1 | St | 0.234 | EA | 0.650 | AA | 0.116 |
| | 3 | 1 | St | 0.234 | EA | 0.650 | AA | 0.116 |
| | 4 | 21 | St | 0.834 | EA | 0.050 | AA | 0.116 |
| | 5 | 1 | Only Polymer 1 is used in the ink. | | | | | |
| | 6 | | Only Block Copolymer 1 is used in the ink. | | | | | |
| Reference Example | 1 | 23 | St | 0.166 | BZMA | 0.635 | AA | 0.199 |
| | 2 | 24 | St | 0.235 | EA | 0.652 | AA | 0.113 |

TABLE 9

Main composition of polymer aqueous solution and main properties of polymer B used

| | | Polymer No. | Acid value (mgKOH/g) | Weight average molecular weight | Hydrogen bond parameter of polymer ($\delta h$) (*1) | Hydrogen bond parameter of hydrophobic monomer ($\delta h$) (*2) | n-BA/St mass ratio (*3) | Polymer aqueous solution No. | Content of polymer B (%) |
|---|---|---|---|---|---|---|---|---|---|
| Example | 28 | 16 | 125 | 7,000 | 1.9 | 1.2 | 0.54 | 16 | 15.0 |
| | 29 | 17 | 136 | 7,000 | 1.0 | 0.0 | — | 17 | 15.0 |
| | 30 | 12 | 125 | 7,000 | 1.9 | 1.1 | 0.50 | 12 | 15.0 |
| | 31 | 12 | 125 | 7,000 | 1.9 | 1.1 | 0.50 | 12 | 15.0 |
| | 32 | 12 | 125 | 7,000 | 1.9 | 1.1 | 0.50 | 12 | 15.0 |
| | 33 | 12 | 125 | 7,000 | 1.9 | 1.1 | 0.50 | 12 | 15.0 |
| | 34 | 12 | 125 | 7,000 | 1.9 | 1.1 | 0.50 | 12 | 15.0 |
| | 35 | 12 | 125 | 7,000 | 1.9 | 1.1 | 0.50 | 12 | 15.0 |
| | 36 | 12 | 125 | 7,000 | 1.9 | 1.1 | 0.50 | 12 | 15.0 |
| | 37 | 12 | 125 | 7,000 | 1.9 | 1.1 | 0.50 | 12 | 15.0 |
| | 38 | 12 | 125 | 7,000 | 1.9 | 1.1 | 0.50 | 12 | 15.0 |
| | 39 | 12 | 125 | 7,000 | 1.9 | 1.1 | 0.50 | 12 | 15.0 |
| | 40 | 12 | 125 | 7,000 | 1.9 | 1.1 | 0.50 | 12 | 15.0 |
| | 41 | 5 | 125 | 7,000 | 1.6 | 0.8 | 0.28 | 5 | 15.0 |
| | 42 | 5 | 125 | 7,000 | 1.6 | 0.8 | 0.28 | 5 | 15.0 |
| | 43 | 5 | 125 | 7,000 | 1.6 | 0.8 | 0.28 | 5 | 15.0 |
| | 44 | 5 | 125 | 7,000 | 1.6 | 0.8 | 0.28 | 5 | 15.0 |
| | 45 | 18 | 125 | 6,000 | 1.6 | 0.8 | 0.28 | 18 | 15.0 |
| | 46 | 19 | 88 | 7,000 | 1.3 | 0.8 | 0.29 | 19 | 15.0 |
| Comparative Example | 1 | 20 | 109 | 7,000 | 3.3 | 2.9 | — | 20 | 15.0 |
| | 2 | 1 | 90 | 7,000 | 3.2 | 2.9 | — | 1 | 15.0 |
| | 3 | 1 | 90 | 7,000 | 3.2 | 2.9 | — | 1 | 15.0 |
| | 4 | 21 | 90 | 7,000 | 0.9 | 0.2 | — | 21 | 15.0 |
| | 5 | 1 | Only Polymer 1 is used in the ink. | | | | | 1-2 | — |
| | 6 | | Only Block Copolymer 1 is used in the ink. | | | | | 22 | — |
| Reference Example | 1 | 23 | 155 | 7,000 | 3.2 | 2.5 | — | 23 | 15.0 |
| | 2 | 24 | 88 | 7,000 | 3.2 | 2.9 | — | 24 | 15.0 |

(*1) Hydrogen bond parameter ($\delta h$) of polymer obtained by solubility parameter of monomers constituting the polymer ($cal^{0.5}/cm^{1.5}$)

(*2) Hydrogen bond parameter ($\delta h$) of hydrophobic monomer ($cal^{0.5}/cm^{1.5}$)

(*3) Mass ratio of n-butyl acrylate with respect to styrene in polymer

TABLE 10

| | | Main composition of each ink | | | | | | |
|---|---|---|---|---|---|---|---|---|
| | | Contents in ink (mass %) | | | (A + B)/ | | A/ | B/ |
| | | Pigment | Polymer A | Polymer B | A + B (*1) | Pigment (*2) | B/A (*3) | Pigment (*4) | Pigment (*5) |
| Example | 1 | 2.5 | 1.25 | 2.5 | 3.8 | 1.5 | 2.0 | 0.50 | 1.00 |
| | 2 | 2.5 | 1.25 | 2.5 | 3.8 | 1.5 | 2.0 | 0.50 | 1.00 |
| | 3 | 2.5 | 1.25 | 2.5 | 3.8 | 1.5 | 2.0 | 0.50 | 1.00 |
| | 4 | 2.5 | 1.25 | 2.5 | 3.8 | 1.5 | 2.0 | 0.50 | 1.00 |
| | 5 | 2.5 | 1.25 | 2.5 | 3.8 | 1.5 | 2.0 | 0.50 | 1.00 |
| | 6 | 2.5 | 1.25 | 2.5 | 3.8 | 1.5 | 2.0 | 0.50 | 1.00 |
| | 7 | 2.5 | 1.25 | 2.5 | 3.8 | 1.5 | 2.0 | 0.50 | 1.00 |
| | 8 | 2.5 | 1.25 | 2.5 | 3.8 | 1.5 | 2.0 | 0.50 | 1.00 |
| | 9 | 2.5 | 1.25 | 2.5 | 3.8 | 1.5 | 2.0 | 0.50 | 1.00 |
| | 10 | 2.5 | 1.25 | 2.5 | 3.8 | 1.5 | 2.0 | 0.50 | 1.00 |
| | 11 | 2.5 | 1.25 | 2.5 | 3.8 | 1.5 | 2.0 | 0.50 | 1.00 |
| | 12 | 2.5 | 1.25 | 2.5 | 3.8 | 1.5 | 2.0 | 0.50 | 1.00 |
| | 13 | 2.5 | 1.25 | 2.5 | 3.8 | 1.5 | 2.0 | 0.50 | 1.00 |
| | 14 | 2.5 | 1.25 | 2.5 | 3.8 | 1.5 | 2.0 | 0.50 | 1.00 |
| | 15 | 2.5 | 1.70 | 2.1 | 3.8 | 1.5 | 1.2 | 0.68 | 0.82 |
| | 16 | 2.5 | 1.50 | 2.3 | 3.8 | 1.5 | 1.5 | 0.60 | 0.90 |
| | 17 | 2.5 | 1.87 | 1.9 | 3.7 | 1.5 | 1.0 | 0.75 | 0.74 |
| | 18 | 2.5 | 1.97 | 1.8 | 3.8 | 1.5 | 0.9 | 0.79 | 0.71 |
| | 19 | 2.5 | 1.20 | 1.8 | 3.0 | 1.2 | 1.5 | 0.48 | 0.72 |
| | 20 | 2.5 | 1.10 | 1.7 | 2.8 | 1.1 | 1.5 | 0.44 | 0.66 |
| | 21 | 2.5 | 1.25 | 2.5 | 3.8 | 1.5 | 2.0 | 0.50 | 1.00 |
| | 22 | 2.5 | 1.25 | 2.5 | 3.8 | 1.5 | 2.0 | 0.50 | 1.00 |
| | 23 | 2.5 | 1.25 | 2.5 | 3.8 | 1.5 | 2.0 | 0.50 | 1.00 |
| | 24 | 2.5 | 1.25 | 2.5 | 3.8 | 1.5 | 2.0 | 0.50 | 1.00 |
| | 25 | 2.5 | 1.25 | 2.5 | 3.8 | 1.5 | 2.0 | 0.50 | 1.00 |
| | 26 | 2.5 | 1.25 | 2.5 | 3.8 | 1.5 | 2.0 | 0.50 | 1.00 |
| | 27 | 2.5 | 1.25 | 2.5 | 3.8 | 1.5 | 2.0 | 0.50 | 1.00 |

(*1) Total of contents of polymer A and polymer B
(*2) Ratio of total of contents of polymer A and polymer B to content of pigment
(*3) Ratio of content of polymer B to content of polymer A
(*4) Ratio of content of polymer A to content of pigment
(*5) Ratio of content of polymer B to content of pigment

TABLE 11

| | | Main composition of each ink | | | | | | |
|---|---|---|---|---|---|---|---|---|
| | | Contents in ink (mass %) | | | (A + B)/ | | A/ | B/ |
| | | Pigment | Polymer A | Polymer B | A + B (*1) | Pigment (*2) | B/A (*3) | Pigment (*4) | Pigment (*5) |
| Example | 28 | 2.5 | 1.25 | 2.5 | 3.8 | 1.5 | 2.0 | 0.50 | 1.00 |
| | 29 | 2.5 | 1.25 | 2.5 | 3.8 | 1.5 | 2.0 | 0.50 | 1.00 |
| | 30 | 1.2 | 0.60 | 3.0 | 3.6 | 3.0 | 5.0 | 0.50 | 2.50 |
| | 31 | 1.2 | 0.24 | 3.0 | 3.2 | 2.7 | 12.5 | 0.20 | 2.50 |
| | 32 | 1.2 | 2.40 | 3.0 | 5.4 | 4.5 | 1.3 | 2.00 | 2.50 |
| | 33 | 1.2 | 0.22 | 3.0 | 3.2 | 2.7 | 13.4 | 0.19 | 2.50 |
| | 34 | 1.2 | 2.59 | 3.0 | 5.6 | 4.7 | 1.2 | 2.16 | 2.50 |
| | 35 | 1.2 | 0.60 | 4.0 | 4.6 | 3.8 | 6.7 | 0.50 | 3.34 |
| | 36 | 1.2 | 0.60 | 5.0 | 5.6 | 4.7 | 8.3 | 0.50 | 4.16 |
| | 37 | 1.2 | 0.60 | 2.9 | 3.5 | 2.9 | 4.8 | 0.50 | 2.41 |
| | 38 | 1.2 | 0.60 | 6.0 | 6.6 | 5.5 | 10.0 | 0.50 | 5.00 |
| | 39 | 1.2 | 0.24 | 4.8 | 5.0 | 4.2 | 20.0 | 0.20 | 4.00 |
| | 40 | 1.2 | 0.24 | 5.0 | 5.2 | 4.4 | 20.8 | 0.20 | 4.16 |
| | 41 | 2.5 | 1.25 | 2.5 | 3.8 | 1.5 | 2.0 | 0.50 | 1.00 |
| | 42 | 2.5 | 1.25 | 2.5 | 3.8 | 1.5 | 2.0 | 0.50 | 1.00 |
| | 43 | 2.5 | 1.25 | 2.5 | 3.8 | 1.5 | 2.0 | 0.50 | 1.00 |
| | 44 | 2.5 | 1.25 | 2.5 | 3.8 | 1.5 | 2.0 | 0.50 | 1.00 |
| | 45 | 2.5 | 1.25 | 2.5 | 3.8 | 1.5 | 2.0 | 0.50 | 1.00 |
| | 46 | 2.5 | 1.25 | 2.5 | 3.8 | 1.5 | 2.0 | 0.50 | 1.00 |
| Comparative Example | 1 | 2.5 | 1.25 | 2.5 | 3.8 | 1.5 | 2.0 | 0.50 | 1.00 |
| | 2 | 2.5 | 1.25 | 2.5 | 3.8 | 1.5 | 2.0 | 0.50 | 1.00 |
| | 3 | 2.5 | 1.25 | 2.5 | 3.8 | 1.5 | 2.0 | 0.50 | 1.00 |
| | 4 | 2.5 | 1.25 | 2.5 | 3.8 | 1.5 | 2.0 | 0.50 | 1.00 |
| | 5 | 2.5 | — | — | — | — | — | — | — |
| | 6 | 2.5 | — | — | — | — | — | — | — |

TABLE 11-continued

| | | Contents in ink (mass %) | | | (A + B)/ | | A/ | B/ |
|---|---|---|---|---|---|---|---|---|
| | Pigment | Polymer A | Polymer B | A + B (*1) | Pigment (*2) | B/A (*3) | Pigment (*4) | Pigment (*5) |
| Reference Example 1 | 2.5 | 1.25 | 2.5 | 3.8 | 1.5 | 2.0 | 0.50 | 1.00 |
| Reference Example 2 | 2.5 | 1.25 | 2.5 | 3.8 | 1.5 | 2.0 | 0.50 | 1.00 |

(*1) Total of contents of polymer A and polymer B
(*2) Ratio of total of contents of polymer A and polymer B to content of pigment
(*3) Ratio of content of polymer B to content of polymer A
(*4) Ratio of content of polymer A to content of pigment
(*5) Ratio of content of polymer B to content of pigment (Evaluation)
(Scratch Resistance)

Each of the inks obtained in the foregoing was mounted on an ink jet recording apparatus (trade name: BJF900; manufactured by Canon Inc.), and a 100%-duty image was formed on a UF120 (manufactured by Canon Inc.) serving as a recording medium. The resultant recorded article was left to stand at room temperature for 1 day, and then the image was scratched with a nail to such an extent that no flaw was formed on the non-recorded portion of the recording medium. The recorded article was visually observed, and was evaluated for its scratch resistance. The evaluation criteria for scratch resistance are as described below. Tables 12 and 13 collectively show the results.

'5': No white portion of the base paper was observed.

'4': White portion was slightly observed.

'3': About a half of the scratched portion turned into white portion.

'2': Most of the scratched portion turned into white portion.

'1': Entirety of the scratched portion turned into white portion.

(Storage Stability)

Each of the inks obtained in the foregoing was charged into a Teflon (registered trademark) container, and was stored at a temperature of 60° C. for 1 month. The particle size of each ink before and after the storage were measured with a particle size measuring device UPA (manufactured by Microtrac), and the ink was evaluated for its storage stability. The evaluation criteria for storage stability are as described below. Tables 12 and 13 collectively show the results.

'5': Rate of particle size increase after the storage was less than 5% as compared to the particle size before the storage.

'4': Rate of particle size increase after the storage was 5% or more to less than 10% as compared to the particle size before the storage.

'3': Rate of particle size increase after the storage was 10% or more to less than 15% as compared to the particle size before the storage.

'2': Rate of particle size increase after the storage was 15% or more to less than 20% as compared to the particle size before the storage.

'1': Rate of particle size increase after the storage was 20% or more as compared to the particle size before the storage, or aggregate was observed after the storage.

TABLE 12

Results of evaluation

| | | Storage stability | Scratch resistance |
|---|---|---|---|
| Example | 1 | 3 | 3 |
| | 2 | 3 | 4 |
| | 3 | 3 | 4 |
| | 4 | 3 | 3 |
| | 5 | 3 | 3 |
| | 6 | 5 | 4 |
| | 7 | 5 | 5 |
| | 8 | 5 | 5 |
| | 9 | 4 | 5 |
| | 10 | 4 | 5 |
| | 11 | 5 | 5 |
| | 12 | 5 | 5 |
| | 13 | 5 | 5 |
| | 14 | 5 | 5 |
| | 15 | 5 | 4 |
| | 16 | 5 | 5 |
| | 17 | 5 | 4 |
| | 18 | 5 | 3 |
| | 19 | 5 | 5 |
| | 20 | 5 | 4 |
| | 21 | 5 | 4 |
| | 22 | 4 | 5 |
| | 23 | 4 | 5 |
| | 24 | 5 | 4 |
| | 25 | 5 | 5 |
| | 26 | 5 | 5 |
| | 27 | 4 | 4 |

TABLE 13

Results of evaluation

| | | Storage stability | Scratch resistance |
|---|---|---|---|
| Example | 28 | 4 | 4 |
| | 29 | 3 | 5 |
| | 30 | 4 | 4 |
| | 31 | 4 | 4 |
| | 32 | 4 | 4 |
| | 33 | 3 | 4 |
| | 34 | 4 | 3 |
| | 35 | 4 | 4 |
| | 36 | 4 | 4 |
| | 37 | 4 | 3 |
| | 38 | 3 | 4 |
| | 39 | 4 | 4 |
| | 40 | 3 | 4 |
| | 41 | 5 | 5 |
| | 42 | 5 | 5 |
| | 43 | 4 | 5 |

TABLE 13-continued

Results of evaluation

|  |  | Storage stability | Scratch resistance |
|---|---|---|---|
|  | 44 | 4 | 5 |
|  | 45 | 3 | 4 |
|  | 46 | 2 | 4 |
| Comparative | 1 | 2 | 1 |
| Example | 2 | 1 | 2 |
|  | 3 | 1 | 2 |
|  | 4 | 2 | 1 |
|  | 5 | 1 | 3 |
|  | 6 | 3 | 1 |
| Reference | 1 | 2 | 2 |
| Example | 2 | 1 | 2 |

While the present invention has been described with respect to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-025141, filed Feb. 5, 2007, and No. 2008-010045, filed Jan. 21, 2008 which are hereby incorporated by reference herein in their entirety.

What is claimed is:

1. An ink jet aqueous ink comprising:
a water-insoluble coloring material; and
a plurality of polymers,
wherein the plurality of polymers comprise (i) a polymer A which relatively contributes to dispersion of the water-insoluble coloring material and (ii) a polymer B which does not relatively contribute to the dispersion of the water-insoluble coloring material as compared to the polymer A,
wherein the polymer A is a block copolymer having an acid value of 120 mgKOH/g to 180 mgKOH/g and having an ethylene oxide group as a nonionic group, and
wherein the polymer B has an acid value of 90 mgKOH/g to 150 mgKOH/g and a hydrogen bond parameter ($\delta h$) of the polymer obtained by solubility parameters of monomers constituting the polymer of 1.0 $cal^{0.5}/cm^{1.5}$ to 3.2 $cal^{0.5}/cm^{1.5}$.

2. An ink jet aqueous ink according to claim 1, wherein the polymer B comprises a hydrophobic monomer having a hydrogen bond parameter ($\delta h$) of the hydrophobic monomer obtained by a solubility parameter of the monomer of 2.8 $cal^{0.5}/cm^{1.5}$ or less.

3. An ink jet aqueous ink according to claim 1, wherein the polymer B has a weight average molecular weight larger than a weight average molecular weight of the polymer A, and the weight average molecular weight of the polymer B is 5,000 or more.

4. An ink jet aqueous ink according to claim 1, wherein a ratio of a total of a content (mass %) of the polymer A with respect to the total mass of the ink and a content (mass %) of the polymer B with respect to a total mass of the ink to a content (mass %) of the water-insoluble coloring material with respect to the total mass of the ink is 1.20 or more.

5. An ink jet aqueous ink according to claim 1, wherein a ratio of the ethylene oxide group constituting the polymer A with respect to a total mass of the polymer A is 10 mass % to 40 mass %.

6. An ink jet aqueous ink according to claim 1, wherein the monomers constituting the polymer B comprises n-butyl acrylate.

7. An ink jet aqueous ink according to claim 6, wherein the monomers constituting the polymer B further comprises styrene.

8. An ink jet aqueous ink according to claim 7, wherein a mass ratio of n-butyl acrylate with respect to styrene in the monomers constituting the polymer B is 0.10 to 0.50.

9. An ink jet aqueous ink according to claim 1, wherein a ratio of a content (mass %) of the polymer B with respect to a total mass of the ink to a content (mass %) of the polymer A with respect to the total mass of the ink is 1.0 or more.

10. An ink jet recording method, comprising:
ejecting ink by an ink jet method; and
performing recording on a recording medium,
wherein the ink is the aqueous ink according to claim 1.

11. An ink jet cartridge, comprising an ink storage portion for storing ink, wherein the ink stored in the ink storage portion is the aqueous ink according to claim 1.

12. A recording unit, comprising:
an ink storage portion for storing ink; and
a recording head for ejecting the ink,
wherein the ink stored in the ink storage portion is the aqueous ink according to claim 1.

13. An ink jet recording apparatus, comprising:
an ink storage portion for storing ink; and
a recording head for ejecting the ink,
wherein the ink stored in the ink storage portion is the aqueous ink according to claim 1.

14. An image formed on a recording medium by ejecting ink according to an ink jet method, wherein the ink is the aqueous ink according to claim 1.

* * * * *